(12) United States Patent
Tani et al.

(10) Patent No.: US 12,000,435 B2
(45) Date of Patent: Jun. 4, 2024

(54) ROLLING BEARING AND SENSOR-EQUIPPED ROLLING BEARING

(71) Applicants: THE SCHOOL CORPORATION KANSAI UNIVERSITY, Osaka (JP); NTN CORPORATION, Osaka (JP)

(72) Inventors: Hiroshi Tani, Suíta (JP); Hiroyuki Hakamata, Iwata (JP); Yusuke Shibuya, Iwata (JP); Sota Yamaguchi, Iwata (JP)

(73) Assignees: THE SCHOOL CORPORATION KANSAI UNIVERSITY, Osaka (JP); NTN CORPORATION, Osaka (JP)

( * ) Notice: Subject to any disclaimer, the term of this patent is extended or adjusted under 35 U.S.C. 154(b) by 230 days.

(21) Appl. No.: 17/438,385

(22) PCT Filed: Mar. 11, 2020

(86) PCT No.: PCT/JP2020/010567
§ 371 (c)(1),
(2) Date: Sep. 10, 2021

(87) PCT Pub. No.: WO2020/184615
PCT Pub. Date: Sep. 17, 2020

(65) Prior Publication Data
US 2022/0154774 A1    May 19, 2022

(30) Foreign Application Priority Data

Mar. 11, 2019 (JP) .................................. 2019-043678
Mar. 11, 2019 (JP) .................................. 2019-043679
Mar. 10, 2020 (JP) .................................. 2020-041262

(51) Int. Cl.
    *F16C 41/00* (2006.01)

(52) U.S. Cl.
    CPC .......... *F16C 41/007* (2013.01); *F16C 41/004* (2013.01)

(58) Field of Classification Search
    CPC ...... F16C 19/52; F16C 41/004; F16C 41/007; F16C 2202/30
    See application file for complete search history.

(56) References Cited

U.S. PATENT DOCUMENTS 4,960,333 A    10/1990   Faye et al.
11,105,374 B2 *  8/2021  Yamamoto ........... F16J 15/3272
                         (Continued)

FOREIGN PATENT DOCUMENTS

CN       1054124 A      8/1991
CN    101105202 A      1/2008
                         (Continued)

OTHER PUBLICATIONS

Translation of JP2016084843 obtained Sep. 11, 2023.*
(Continued)

*Primary Examiner* — James Pilkington
(74) *Attorney, Agent, or Firm* — Rimon P.C.

(57) ABSTRACT

A rolling bearing according to an embodiment includes a stationary ring having a first facing surface, a rotating ring having a second facing surface facing the first facing surface, and rotating relative to the stationary ring, rolling elements arranged between the first facing surface and the second facing surface, a cage that retains the rolling elements, first electrodes and second electrodes fixed in position relative to the stationary ring and arranged in a bearing space between the stationary ring and the rotating ring, third electrodes fixed in position relative to the rotating ring, position relative to the rolling elements, or position relative to the cage and arranged in the bearing space, and an (Continued)

insulating film formed on surfaces of the first electrodes and the second electrodes or surfaces of the third electrodes.

26 Claims, 45 Drawing Sheets

(56) References Cited

U.S. PATENT DOCUMENTS

| | | |
|---|---|---|
| 2003/0234578 A1 | 12/2003 | Takahashi et al. |
| 2005/0218884 A1 | 10/2005 | Koike et al. |
| 2006/0245677 A1 | 11/2006 | Kenworthy et al. |
| 2009/0046964 A1 | 2/2009 | Galeote |
| 2010/0040315 A1 | 2/2010 | Ozaki et al. |
| 2011/0158570 A1 | 6/2011 | Takahashi et al. |
| 2019/0390715 A1 | 12/2019 | Yamamoto et al. |

FOREIGN PATENT DOCUMENTS

| | | |
|---|---|---|
| CN | 101517426 A | 8/2009 |
| CN | 103967942 A | 8/2014 |
| EP | 0511105 A1 | 10/1992 |
| JP | H11-83880 A | 3/1999 |
| JP | 2003-097971 A | 4/2003 |
| JP | 2003-262646 A | 9/2003 |
| JP | 2008-019933 A | 1/2008 |
| JP | 2008-122269 A | 5/2008 |
| JP | 2012-026829 A | 2/2012 |
| JP | 2016-070846 A | 5/2016 |
| JP | 2016-084843 A | 5/2016 |
| JP | 2016-185022 A | 10/2016 |
| JP | 2017-028868 A | 2/2017 |
| JP | 2017-072170 A | 4/2017 |
| JP | 2017-160974 A | 9/2017 |
| JP | 2018-038692 A | 3/2018 |
| WO | 2018/110592 A1 | 6/2018 |

OTHER PUBLICATIONS

Translation of JP2016185022 obtained Sep. 11, 2023.*
International Search Report issued in corresponding International Patent Application No. PCT/JP2020/010567, dated Jun. 16, 2020, with English translation.

* cited by examiner

ROLLING BEARING AND SENSOR-EQUIPPED ROLLING BEARING

CROSS REFERENCE TO RELATED APPLICATIONS

This patent application is the U.S. National Phase under 35 U.S.C. § 371 of International Application No. PCT/JP2020/010567, filed on Mar. 11, 2020, which claims the benefit of Japanese Patent Application No. 2019-043678, dated Mar. 11, 2019, Japanese Patent Application No. 2019-043679, dated Mar. 11, 2019, and, Japanese Application No. 2020-041262, filed Mar. 10, 2020, the entire contents of each are hereby incorporated by reference in their entirety.

TECHNICAL FIELD

The present invention relates to a rolling bearing and a sensor-equipped rolling bearing.

BACKGROUND ART

PTL 1 (Japanese Patent Laying-Open No. 2008-019933) describes a bearing system. The bearing system described in PTL 1 includes a rolling bearing, a first sensor, and a second sensor. The first sensor is a sensor for detecting a rotation speed of a rotating ring, and the second sensor is a sensor for detecting a revolution speed of a cage or a rolling element.

Other examples of the bearing system composed of a rolling bearing and a sensor include a bearing system described in PTL 2 (Japanese Patent Laying-Open No. 2017-160974) and a bearing system described in PTL 3 (Japanese Patent Laying-Open No. 2018-038692).

PTL 4 (Japanese Patent Laying-Open No. 2003-262646) describes a claw pole generator. The claw pole generator described in PTL 4 includes a rotation shaft, a permanent magnet, and a stator. The permanent magnet is attached to the rotation shaft such that north poles and south poles are alternately arranged along the circumferential direction. The stator includes a coil and a yoke. The yoke is formed of a magnetic material having pawls (pawl-shaped members) and contains the coil. With rotation of the rotation shaft, the magnetic poles of the permanent magnet facing the pawls alternately switch to reverse the magnetic flux in the yoke, thereby generating electromotive force in the coil.

CITATION LIST

Patent Literature

PTL 1: Japanese Patent Laying-Open No. 2008-019933
PTL 2: Japanese Patent Laying-Open No. 2017-160974
PTL 3: Japanese Patent Laying-Open No. 2018-038692
PTL 4: Japanese Patent Laying-Open No. 2003-262646

SUMMARY OF INVENTION

Technical Problem

In the bearing systems described in PTL 1 to PTL 3, it is necessary to externally attach a sensor such as a magnetic sensing element to the rolling bearing. The claw pole generator described in PTL 4 requires a space for arranging the coil, the permanent magnet, and the yoke, and therefore it is difficult to accommodate them in the interior of a bearing. More specifically, in order to introduce the claw pole generator described in PTL 4 in an existing facility, it is necessary to revise the design around a bearing in the facility. If the claw pole generator described in PTL 4 is introduced into a new facility, the size of the facility is increased.

The present invention is made in view of the problems of conventional techniques as described above. More specifically, the present invention provides a rolling bearing capable of incorporating a sensor capable of detecting a state of the rolling bearing or a power generating function without increasing the dimensions.

Solution to Problem

A rolling bearing according to an embodiment includes a stationary ring having a first opposing surface, a rotating ring having a second opposing surface facing the first opposing surface and rotating relative to the stationary ring, rolling elements arranged between the first opposing surface and the second opposing surface, a cage that retains the rolling elements, first electrodes and second electrodes, third electrodes fixed in position relative to the rotating ring, position in the rolling elements, or position relative to the cage, and an insulating film formed on surfaces of the first electrodes and the second electrodes. The third electrodes are each arranged such that a first distance that is a distance from the first electrode and a second distance that is a distance from the second electrode change with rotation of the rotating ring relative to the stationary ring. A time-variable phase of the first distance is shifted from a time-variable phase of the second distance. The insulating film may be formed on surfaces of the third electrodes.

In the rolling bearing according to an aspect of the present invention, when the first distance decreases, positive charges are induced in the first electrode, and negative charges are induced in the second electrode. As the first distance increases, current flows from the first electrode to the second electrode due to charges induced in the electrodes. In the rolling bearing according to an aspect of the present invention, when the second distance decreases, negative charges are induced in the first electrode, and positive charges are induced in the second electrode. As the second distance increases, current flows from the second electrode to the first electrode due to charges induced in the electrodes. In the rolling bearing according to an aspect of the present invention, the current described above enables construction of a sensor that determines the operating state of the rolling bearing or a power generating function. Accordingly, a sensor or a power generating function can be incorporated without increasing the dimensions.

In the rolling bearing, the rolling elements or the cage may serve as the third electrodes.

In the rolling bearing, the rolling elements may be balls. The cage may serve as the third electrodes. The cage may have a protrusion projecting along the center axial direction at a portion retaining each rolling element. In the rolling bearing, the rolling elements may be arranged at regular intervals along a circumferential direction. The number of the first electrodes and the number of the second electrodes each may be an integer multiple of the number of the rolling elements. The first electrodes and the second electrodes may be alternately arranged at regular intervals along the circumferential direction.

In the rolling bearing, the cage may serve as the third electrodes. A surface of the cage that faces the first electrodes may have protrusions each projecting toward the first electrode. In the rolling bearing, the protrusions may be arranged at regular intervals along a circumferential direction. The number of the first electrodes and the number of the second electrodes each may be an integer multiple of the number of the protrusions. The first electrodes and the second electrodes may be alternately arranged at regular intervals along the circumferential direction.

The rolling bearing may further include a seal member defining a bearing space between the stationary ring and the rotating ring. The first electrodes and the second electrodes may be arranged on a surface on the bearing space side of the seal member.

In the rolling bearing, the insulating film may be of a material having high triboelectric charging characteristics, for example, a polytetrafluoroethylene (PTFE) film. In the rolling bearing, the insulating film may have a thickness equal to or less than 100 μm.

In the rolling bearing, the first electrodes and the second electrodes may be arranged in a bearing space between the stationary ring and the rotating ring and may be fixed in position relative to the stationary ring. The third electrodes may be fixed in position relative to the rotating ring and may be arranged in the bearing space. In the rolling bearing, the insulating film may have a thickness equal to or less than 100 μm.

The rolling bearing may further include a first, annular member formed of a conductive material and attached to the second facing surface. The first annular member may have a first surface facing the first opposing surface and a second surface facing the second opposing surface. The first surface may have a protrusion projecting toward an opposite direction to the second surface. The protrusion may form the third electrode.

The rolling bearing described above may further include a second annular member attached to the second facing surface. The second annular member may have a first surface facing the first facing surface and a second surface facing the second facing surface. The first surface may have a depression recessed toward the second surface, and the third electrode may be arranged in the depression.

The rolling bearing described above may further include a substrate having an annular shape and attached to the first facing surface. The substate may have a third surface facing the second facing surface and a fourth surface facing the first facing surface. The first electrodes and the second electrodes may be formed on the third surface.

The rolling bearing may further include a seal member at least partially closing the bearing space. The first electrodes and the second electrodes may be arranged on a surface on the bearing space side of the seal member.

In the rolling bearing, the third electrodes may be formed at the rotating ring. In the rolling bearing, the first electrodes and the second electrodes may be formed at the stationary ring.

In the rolling bearing, the first electrodes and the second electrodes may be alternately arranged at regular intervals along a circumferential direction. The third electrodes may be arranged at regular intervals along the circumferential direction. The number of the third electrodes may be equal to the number of the first electrodes and the number of the second electrodes.

The rolling bearing may further include a coating film formed at least one of on the insulating film and on the third electrodes. In the rolling beating, the coating film may be formed of DLC. In the rolling bearing, the coating film may be formed of an alloy containing nickel. In the rolling bearing, the insulating film may be formed of DLC.

A sensor-equipped rolling bearing according to an aspect of the present invention includes the rolling bearing and a detection unit that detects a revolution speed of the cage based on a voltage between the first electrode and the second electrode. In the sensor-equipped rolling bearing, the detection unit may be capable of estimating a relative rotation speed of the rotating ring to the stationary ring based on the revolution speed of the cage.

A sensor-equipped rolling bearing according to another aspect of the present invention includes the rolling bearing and a detection unit that detects a state of lubricant supplied in interior of the rolling bearing based on a voltage between the first electrode and the second electrode. In the sensor-equipped rolling bearing, the state of the lubricant detected by the detection unit may be the amount of water contained in the lubricant.

Advantageous Effects of Invention

In the rolling bearing according to an aspect of the present invention, a sensor capable of detecting a state of the rolling bearing can be readily constructed.

DESCRIPTION OF EMBODIMENTS

Figure 1:
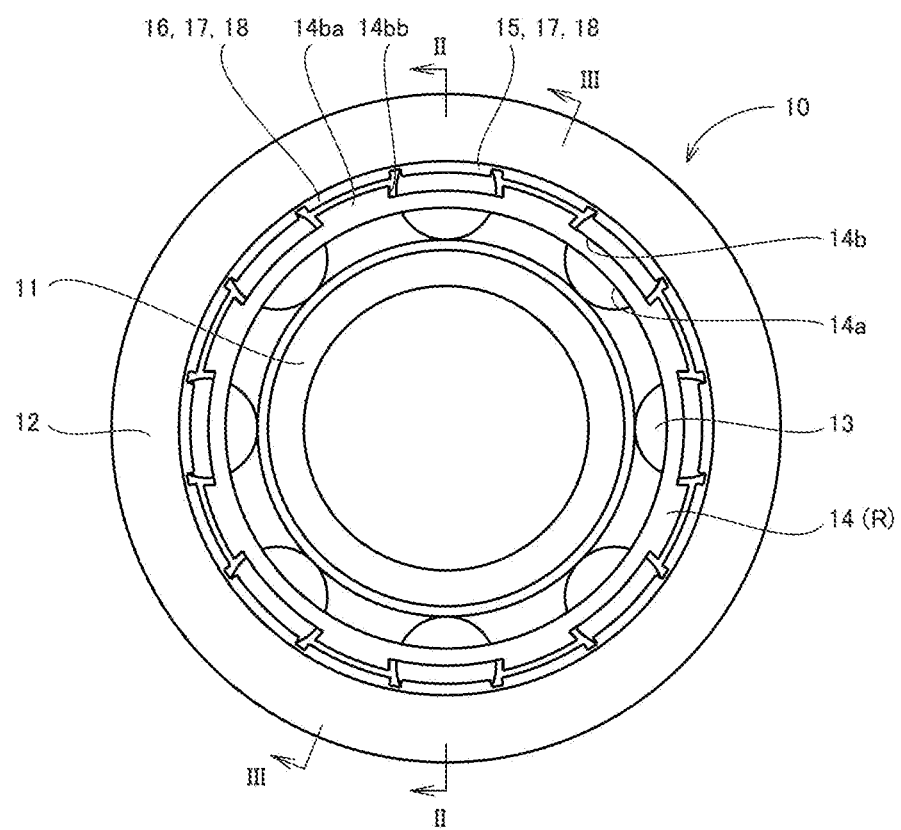
FIG. 1 is a top view of a rolling bearing 10.

The detail of embodiments of the present invention will be described in conjunction with the drawings. In the following drawings, like or corresponding parts are denoted by like reference numerals and an overlapping description will not be repeated.

First Embodiment

A configuration of a rolling bearing (hereinafter referred to as "rolling bearing 10") according to a first embodiment will be described below.

Figure 2:
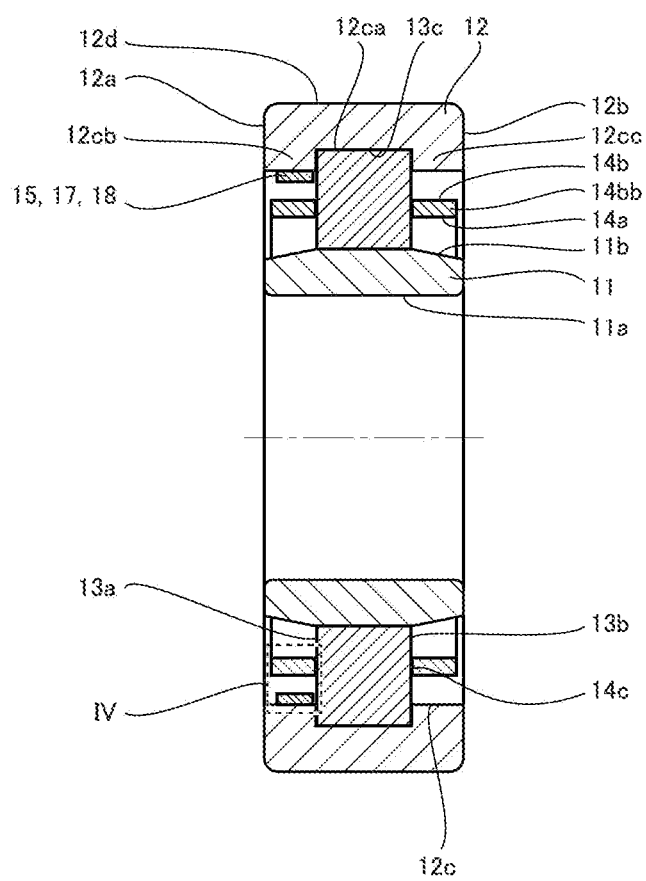
FIG. 2 is a cross-sectional view along line II-II in FIG. 1.
Figure 3:
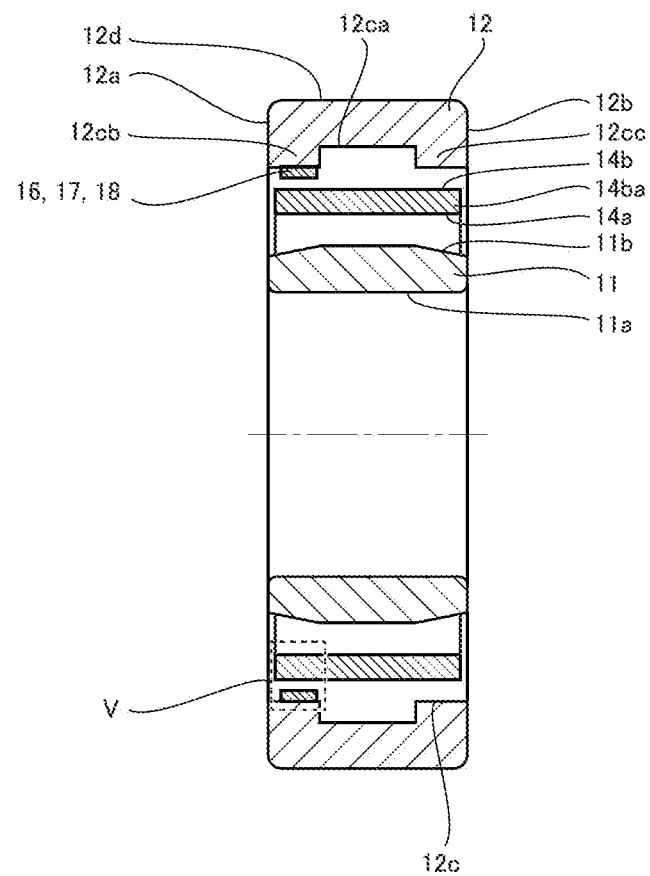
FIG. 3 is a cross-sectional view along line in FIG. 1.

FIG. 1 is a top view of rolling bearing 10. FIG. 2 is a cross-sectional view along line II-II in FIG. 1. FIG. 3 is a cross-sectional view along line III-III in FIG. 1. As shown in FIG. 1 to FIG. 3, rolling bearing 10 is a cylindrical roller bearing. Rolling bearing 10 includes an inner ring 11, an outer ring 12, rolling elements 13, a cage 14, first electrodes 15, second electrodes 16, an insulating film 17, and an insulating film 18 (see FIG. 4 and FIG. 5 for more detail).

Inner ring 11 has an annular (ring-like) shape. Inner ring 11 has an inner peripheral surface 11a and an outer peripheral surface 11b. Outer peripheral surface 11b has a raceway surface of inner ring 11. A shaft (not shown) is inserted in inner ring 11.

Outer ring 12 has an annular shape. Outer ring 12 has a top surface 12a, a bottom surface 12b, an inner peripheral surface 12c, and an outer peripheral surface 12d. Top surface 12a and bottom surface 12b form end surfaces in the center axial direction of rolling bearing 10. The center axial direction refers to a direction along the axis of rotation of a rotating ring (inner ring 11 in rolling bearing 10) of a rolling bearing. Inner peripheral surface 12c is continuous to top surface 12a and bottom surface 12b. Outer peripheral surface 12d is continuous to top surface 12a and bottom surface 12b. Outer ring 12 is arranged on the outside of inner ring 11 such that inner peripheral surface 12c faces outer peripheral surface 11b. Outer ring 12 is attached to a housing (not shown).

Inner peripheral surface 12c has a depression 12ca. Inner peripheral surface 12c is recessed toward outer peripheral surface 12d at depression 12ca. The bottom surface of depression 12ca forms a raceway surface of outer ring 12. To put this in a different way, inner peripheral surface 12c has a flange 12cb formed on the top surface 12a side of depression 12ca and a flange 12cc formed on the bottom surface 12b side of depression 12ca, and inner peripheral surface 12c between flange 12cb and flange 12cc forms a raceway surface of outer ring 12.

Rolling element 13 has a cylindrical shape. Rolling element 13 has a top surface 13a, a bottom surface 13b, and an outer peripheral surface 13c. Outer peripheral surface 13c is continuous to top surface 13a and bottom surface 13b. Outer peripheral surface 13c forms a rolling surface of rolling element 13. Rolling element 13 is arranged between inner ring 11 and outer ring 12. More specifically, rolling element 13 is arranged in depression 12ca such that outer peripheral surface 13c is in contact with the bottom surface of depression 12ca and outer peripheral surface 11b and that top surface 13a and bottom surface 13b face the side surfaces of depression 12ca.

Cage 14 serves as third electrodes R. Cage 14 is a machined cage. Cage 14 is formed of, for example, a conductive material. Cage 14 has an annular shape. Cage 14 has an inner peripheral surface 14a, an outer peripheral surface 14b, and through holes 14c. Cage 14 is arranged between inner ring 11 and outer ring 12 such that inner peripheral surface 14a faces outer peripheral surface 11b and that outer peripheral surface 14b faces inner peripheral surface 12c. Through holes 14c each pass through cage 14 in the thickness direction (the direction from inner peripheral surface 14a toward outer peripheral surface 14b). A plurality of through holes 14c are formed at regular intervals along a circumferential direction. The circumferential direction is a direction along the circumference of a circle about the axis of rotation of a rotating ring (in rolling bearing 10, inner ring 11) of a rolling bearing as viewed from the center axial direction. The number of through holes 14c is equal to the number of rolling elements 13. Rolling element 13 is arranged in each through hole 14c. Rolling elements 13 are thus retained in cage 14 such that the intervals in the circumferential direction between rolling elements 13 are regular intervals.

Outer peripheral surface 14b has protrusions 14ba. Outer peripheral surface 14b projects to the opposite side to inner peripheral surface 14a at each protrusion 14ba. It is preferable that the number of protrusions 14ba is equal to the number of rolling elements 13. It is preferable that protrusions 14ba are arranged at regular intervals along the circumferential direction. Outer peripheral surface 14b has depressions 14bb. Outer peripheral surface 14b is recessed toward inner peripheral surface 14a at each depression 14bb. It is preferable that the number of depressions 14bb is equal to the number of rolling elements 13. Depression 14bb is arranged between two protrusions 14ba adjacent to each other. That is, protrusions 14*ba* and depressions 14*bb* are alternately formed at regular intervals along the circumferential direction.

It is preferable that the width in the circumferential direction of protrusion 14*ba* is equal to the width in the circumferential direction of first electrode 15 and the width in the circumferential direction of second electrode 16. The width in the circumferential direction of protrusion 14*ba* (first electrode 15, second electrode 16) is the angle formed by a straight line connecting one end in the circumferential direction of protrusion 14*ba* (first, electrode 15, second electrode 16) and the center axis of inner ring 11 with a straight line connecting the other end in the circumferential direction of protrusion 14*ba* (first electrode 15, second electrode 16) and the center axis of inner ring 11. This can increase the area where first electrode 15 (second electrode 16) faces third electrode R (protrusion 14*ba*) and can increase the amount of electricity generated. When there is a restriction in design or when the width in the circumferential direction of first electrode 15 is not equal to the width in the circumferential direction of second electrode 16, the width in the circumferential direction of protrusion 14*ba* is set such that the area that faces first electrode 15 (second electrode 16) is maximized.

First electrodes 15 and second electrodes 16 are formed of a conductive material. First electrodes 15 and second electrodes 16 are formed of, for example, copper (Cu) or copper alloy. First electrodes 15 and second electrodes 16 are arranged each at a position facing cage 14. More specifically, first electrodes 15 and second electrodes 16 are arranged on inner peripheral surface 12*c* positioned at flange 12*cb*. The number of first electrodes 15 and the number of second electrodes 16 are each an integer multiple of the number of protrusions 14*ba*. As used herein "the number of first electrodes 15 and the number of second electrodes 16 are each an integer multiple of the number of protrusions 14*ba*" includes a case where the number of first electrodes 15 and the number of second electrodes 16 are each equal to the number of protrusions 14*ba*. First electrodes 15 and second electrodes 16 are alternately arranged at regular intervals along the circumferential direction. A plurality of first electrodes 15 may be formed integrally, and a plurality of second electrodes 16 may be formed integrally. However, first electrodes 15 are electrically isolated from second electrodes 16.

Cage 14 revolves along the circumferential direction with relative rotation of inner ring 11 to outer ring 12. The distance in the radial direction between third electrode R (in rolling bearing 10, cage 14) and first electrode 15 is referred as a first distance, and the distance in the radial direction between third electrode R and second electrode 16 is referred to as a second distance. Since outer peripheral surface 14*b* has protrusions 14*ba* (and depressions 14*bb*), the first distance and the second distance change with time with relative rotation of inner ring 11 to outer ring 12 (with revolution of cage 14).

First electrodes 15 and second electrodes 16 are arranged such that the phase of temporal change of the first distance involved with relative rotation of inner ring 11 to outer ring 12 and the phase of temporal change of second distance involved with relative rotation of inner ring 11 to outer ring 12 are shifted from each other.

In rolling bearing 10, protrusions 14*ba* are arranged at regular intervals along the circumferential direction. Furthermore, in rolling bearing 10, the number of first electrodes 15 and the number of second electrodes 16 are each an integer multiple of the number of protrusions 14*ba*. In addition, in rolling bearing 10, first electrodes 15 and second electrodes 16 are alternately arranged at regular intervals along the circumferential direction. Therefore, in rolling bearing 10, second electrode 16 does not face protrusion 14*ba* when first electrode 15 faces protrusion 14*ba*, and first electrode 15 does not face protrusion 14*ba* when second electrode 16 faces protrusion 14*ba*. Consequently, the phase of temporal change of the first distance is the opposite phase to the phase of temporal change of the second distance.

Figure 4:
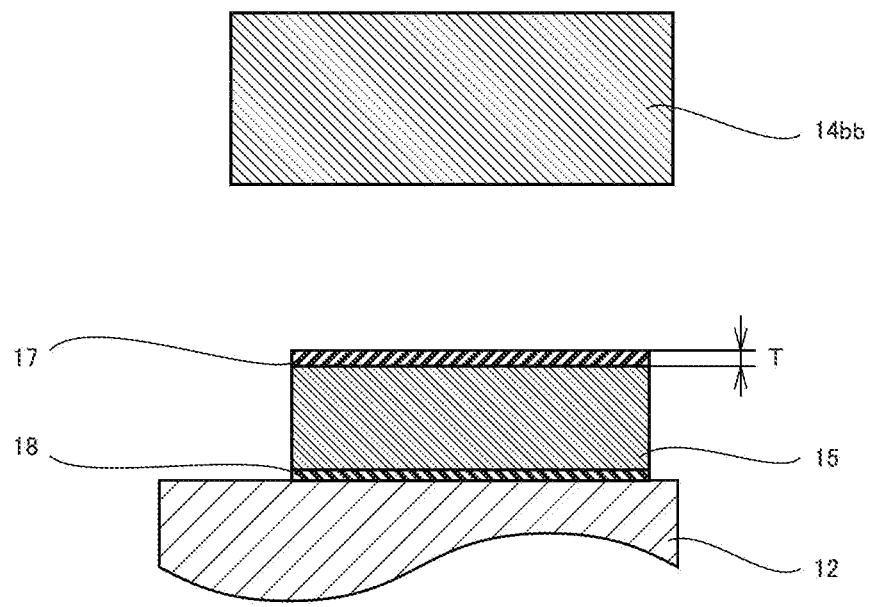
FIG. 4 is an enlarged view of region IV in FIG. 2.
Figure 5:
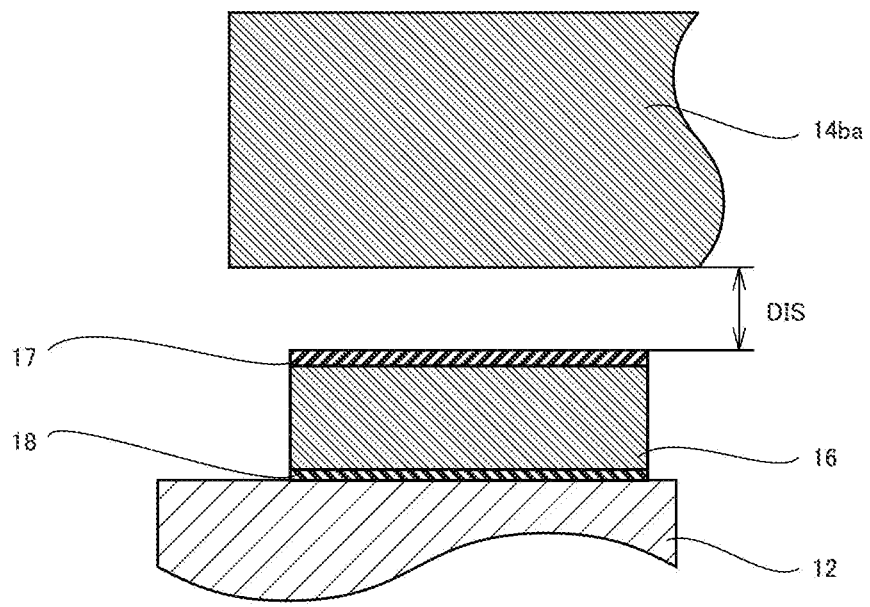
FIG. 5 is an enlarged view of region V in FIG. 3.

FIG. 4 is an enlarged view of region IV in FIG. 2. FIG. 5 is an enlarged view of region V in FIG. 3. As shown in FIG. 4 and FIG. 5, insulating film 17 is formed on first electrode 15 and second electrode 16. Insulating film 17 is formed of an insulating material. Insulating film 17 is formed of, for example, polytetrafluoroethylene (insulating film 17 is a polytetrafluoroethylene film). Insulating film 18 is formed between outer ring 12 (more specifically, flange 12*cb*) and each of first electrode 15 and second electrode 16. Insulating film 18 is formed of an insulating material. First electrode 15 and second electrode 16 are thus electrically insulated from outer ring 12.

Thickness T of insulating film 17 is preferably equal to or less than 180 μm. Thickness T is further preferably equal to or less than 100 μm. Thickness T is, for example, equal to or more than 12.5 μm. The distance between insulating film 17 and protrusion 14*ba* when protrusion 14*ba* faces first electrode 15 (second electrode 16) is referred to as distance DIS. It is preferable that distance DIS is equal to or less than 0.2 mm. Distance DIS may be zero. That is, in a state in which protrusion 14*ba* faces first electrode 15 (second electrode 16), protrusion 14*ba* may be in contact with insulating film 17.

The effect of rolling bearing 10 will be described below.

Figure 6A:
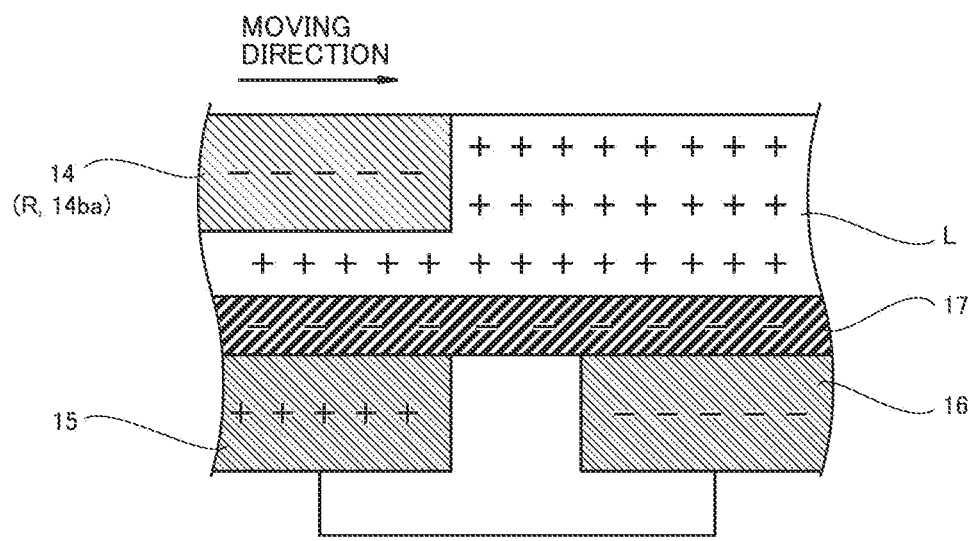
FIG. 6A is a first illustration for explaining the effect of rolling bearing 10.
Figure 6B:
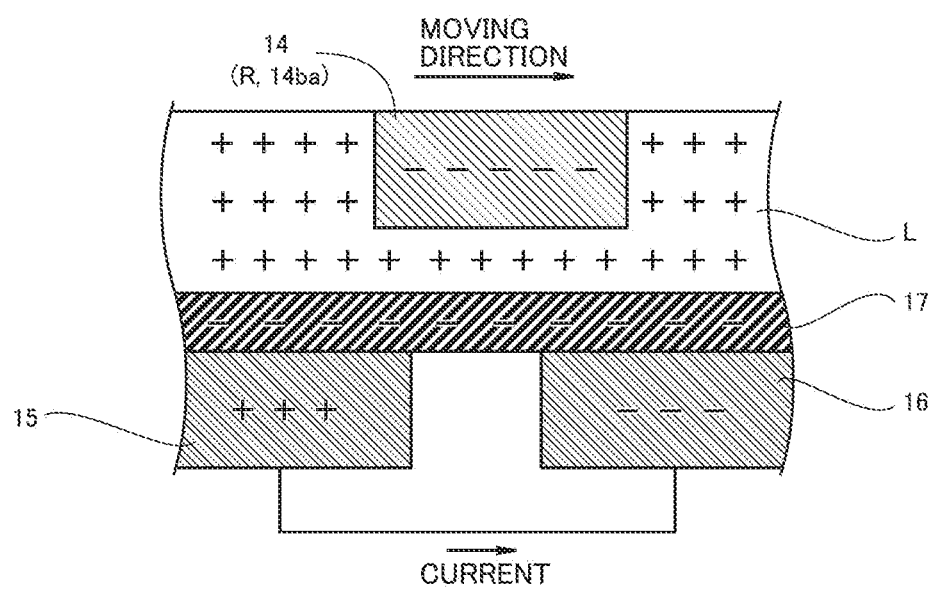
FIG. 6B is a second illustration for explaining the effect of rolling bearing 10.
Figure 6C:
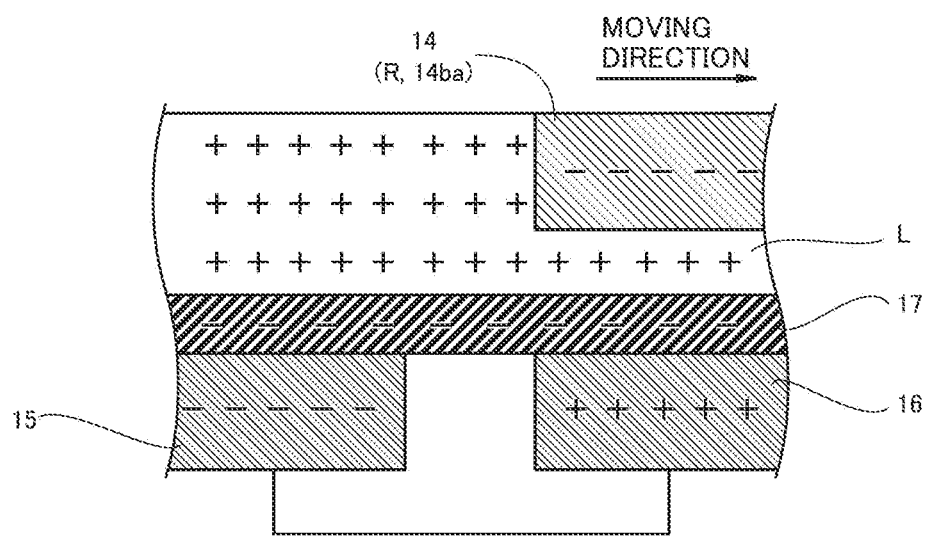
FIG. 6C is a third illustration for explaining the effect of rolling bearing 10.
Figure 6D:
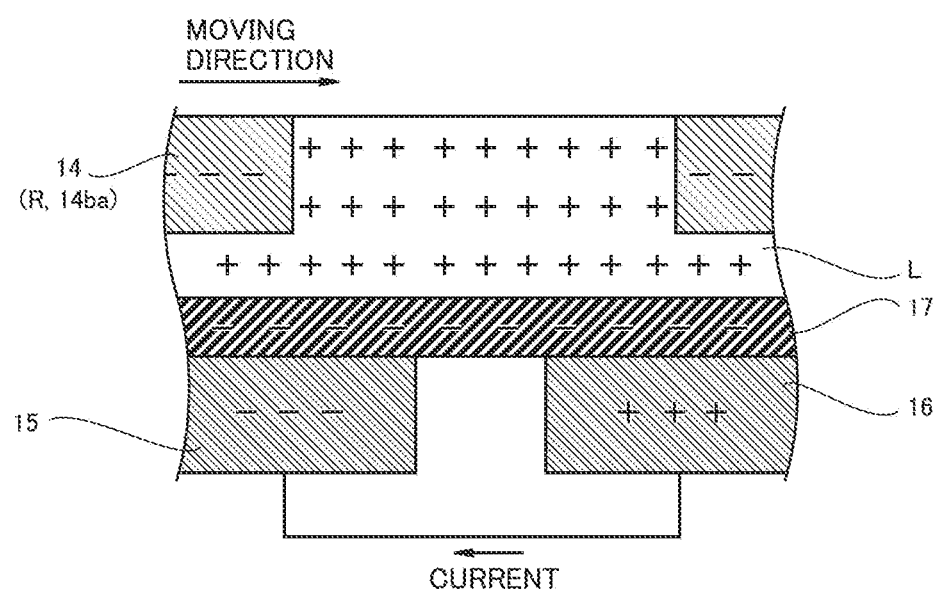
FIG. 6D is a fourth illustration for explaining the effect of rolling bearing 10.

FIG. 6A is a first illustration for explaining the effect of rolling bearing 10. FIG. 6B is a second illustration for explaining the effect of rolling bearing 10. FIG. 6C is a third illustration for explaining the effect of rolling bearing 10. FIG. 6D is a fourth illustration for explaining the effect of rolling bearing 10.

In operation of rolling bearing 10, lubricant L such as lubricating oil or grease is supplied to the interior of rolling bearing 10. Therefore, as shown in FIG. 6A, with relative rotation of inner ring 11 to outer ring 12, insulating film 17 on first electrode 15 and protrusion 14*ba* slide on each other with lubricant L interposed. As a result, positive charges are induced in first electrode 15, and negative charges are induced in second electrode 16.

When the relative rotation of inner ring 11 to outer ring 12 proceeds from the state shown in FIG. 6A, as shown in FIG. 6B, current flows from first electrode 15 to second electrode 16 based on electromotive force resulting from charges induced in each electrode.

When the relative rotation of inner ring 11 to outer ring 12 proceeds from the state shown in FIG. 6B, as shown in FIG. 6C, insulating film 17 on second electrode 16 and protrusion 14*ba* slide on each other with lubricant L interposed. As a result, negative charges are induced in first electrode 15, and positive charges are induced in second electrode 16.

When the relative rotation of inner ring 11 to outer ring 12 proceeds from the state shown in FIG. 6C, as shown in FIG. 6D, current flows from second electrode 16 to first electrode 15 based on electromotive force resulting from charges induced in each electrode. When the relative rotation of inner ring 11 to outer ring 12 proceeds from the state shown in FIG. 6D, the state shown in FIG. 6A returns. In this way, in rolling bearing 10, pulsed current (voltage) is output from first electrode 15 and second electrode 16, with relative rotation of inner ring 11 to outer ring 12. In the following, the voltage between first electrode 15 and second electrode 16 is referred to as voltage between electrodes.

Figure 7:
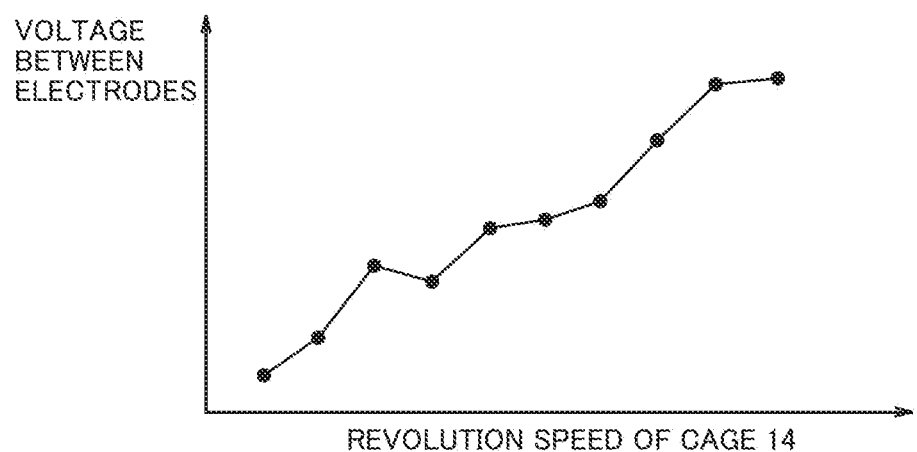
FIG. 7 is a schematic graph showing the relation between the voltage between electrodes and the revolution speed of a cage 14.
Figure 8:
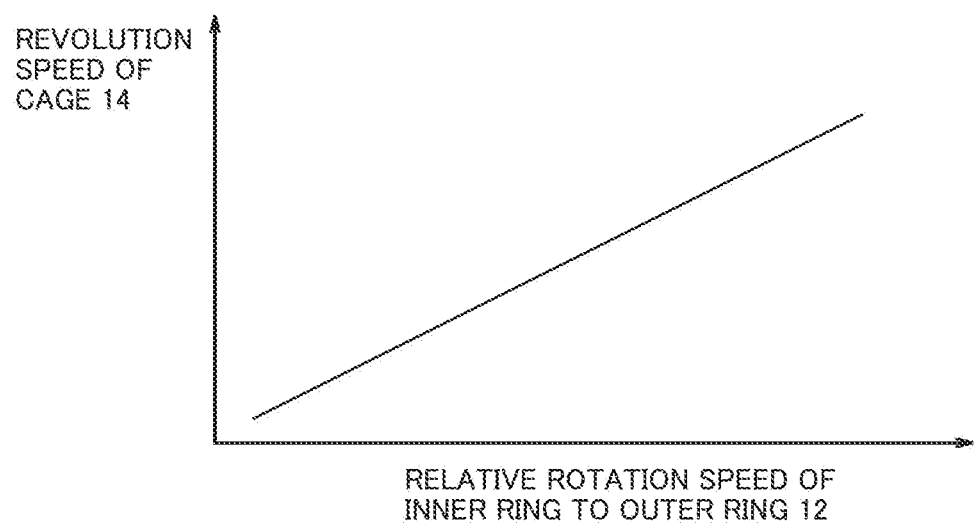
FIG. 8 is a schematic graph showing the relation between the relative rotation speed of an inner ring 11 to an outer ring 12 and the revolution speed of cage 14.

FIG. 7 is a schematic graph showing the relation between the voltage between electrodes and the revolution speed of cage 14. FIG. 8 is a schematic graph showing the relation between the relative rotation speed of inner ring 11 to outer ring 12 and the revolution speed of cage 14. In FIG. 7, the horizontal axis represents the revolution speed of cage 14, and the vertical axis represents the amplitude of the voltage between electrodes. In FIG. 8, the horizontal axis represents the relative rotation speed of inner ring 11 to outer ring 12, and the vertical axis represents the revolution speed of the cage.

As shown in FIG. 7, as the revolution speed of cage 14 increases, the voltage between electrodes increases. Furthermore, as shown in FIG. 8, as the rotation speed of inner ring 11 to outer ring 12 increases, the rotation speed of cage 14 increases. Specifically, a linear relation holds between the rotation speed of inner ring 11 to outer ring 12 and the revolution speed of cage 14. As the relative rotation speed of inner ring 11 to outer ring 12 increases, the voltage between electrodes increases. Therefore, in rolling bearing 10, a sensor for detecting the relative rotation speed of inner ring 11 to outer ring 12 (or detecting the revolution speed of cage 14) by monitoring the voltage between electrodes can be readily constructed.

When the amount of water included in lubricant L changes, the permittivity of lubricant L changes. As a result, when protrusion 14ba slides on insulating film 17, the quantity of charge induced in first electrode 15 and second electrode 16 changes and the resulting voltage between electrodes also changes. Therefore, in rolling bearing 10, a sensor for detecting the amount of water included in lubricant L by monitoring the voltage between electrodes can be readily constructed. Since the permittivity of lubricant L is also changed by inclusion of wear particles (iron particles) in lubricant L and deterioration of lubricant L (thermal degradation, decrease in base oil in lubricant L), inclusion of wear particles in lubricant L and degradation of lubricant L can also be detected by monitoring the voltage between electrodes.

Electricity generated in first electrode 15 and second electrode 16 can be stored in a power storage unit such as a capacitor. Therefore, in rolling bearing 10, a power generating device can be readily constructed.

When protrusions 14ba are arranged at regular intervals along the circumferential direction, the numbers of first electrodes 15 and second electrodes 16 are each equal to the number of protrusions 14ba, and first electrodes 15 and second electrodes 16 are arranged at regular intervals along the circumferential direction, the temporal change of the first distance and the temporal change of the second distance are in opposite phases to each other. Thus, in this, case, the voltage between electrodes and current flowing between first electrode 15 and second electrode 16 can be maximized.

As thickness T decreases, the quantity of charge induced in first electrode 15 and second electrode 16 when protrusion 14ba slides on insulating film 17 increases. Furthermore, as distance DIS decreases, the quantity of charge induced in first electrode 15 and second electrode 16 when protrusion 14ba slides on insulating film 17 increases. Thus, the voltage between electrodes and current flowing between first electrode 15 and second electrode 16 can be increased by reducing thickness T and distance DIS.

<Modifications>

A first modification of rolling bearing 10 will be described below.

Figure 9:
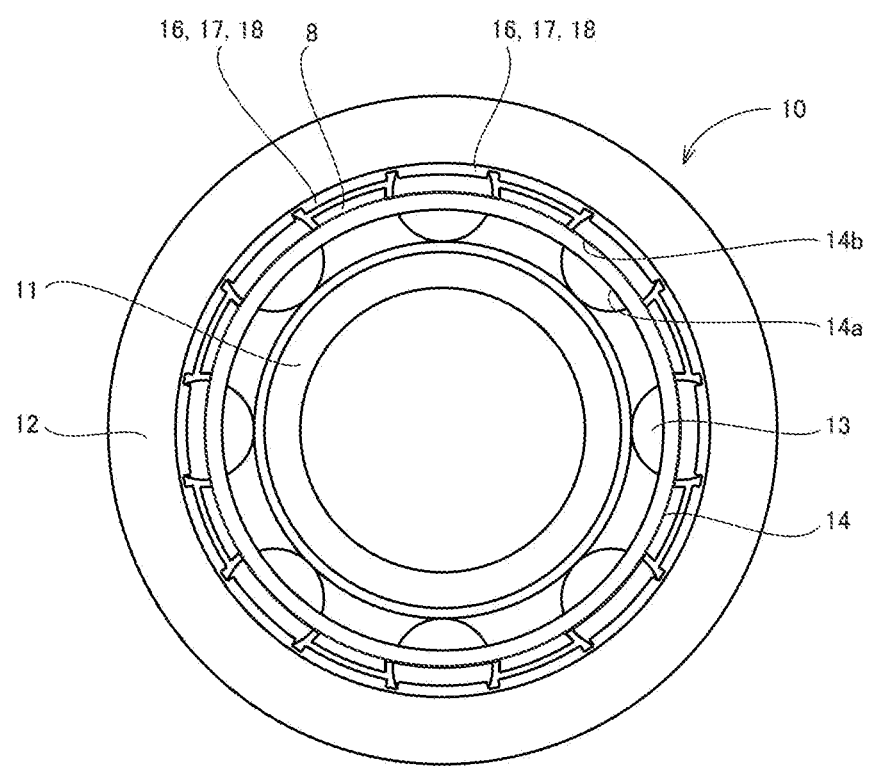
FIG. 9 is a top view of a modification of rolling, bearing 10.

FIG. 9 is a top view of a modification of rolling bearing 10. As shown in FIG. 9, in a modification, cage 14 is formed of an insulating material (for example, resin material). In the first modification, third electrodes R are formed on outer peripheral surface 14b, in place of protrusions 14ba. Thus, the modification also operates similarly to rolling bearing 10.

Second Embodiment

A configuration of a rolling bearing (hereinafter referred to as "rolling bearing 10A") according to a second embodiment will be described below. Here, the differences from the configuration of rolling bearing 10 will be mainly described and an overlapping description will not be repeated.

Figure 10:
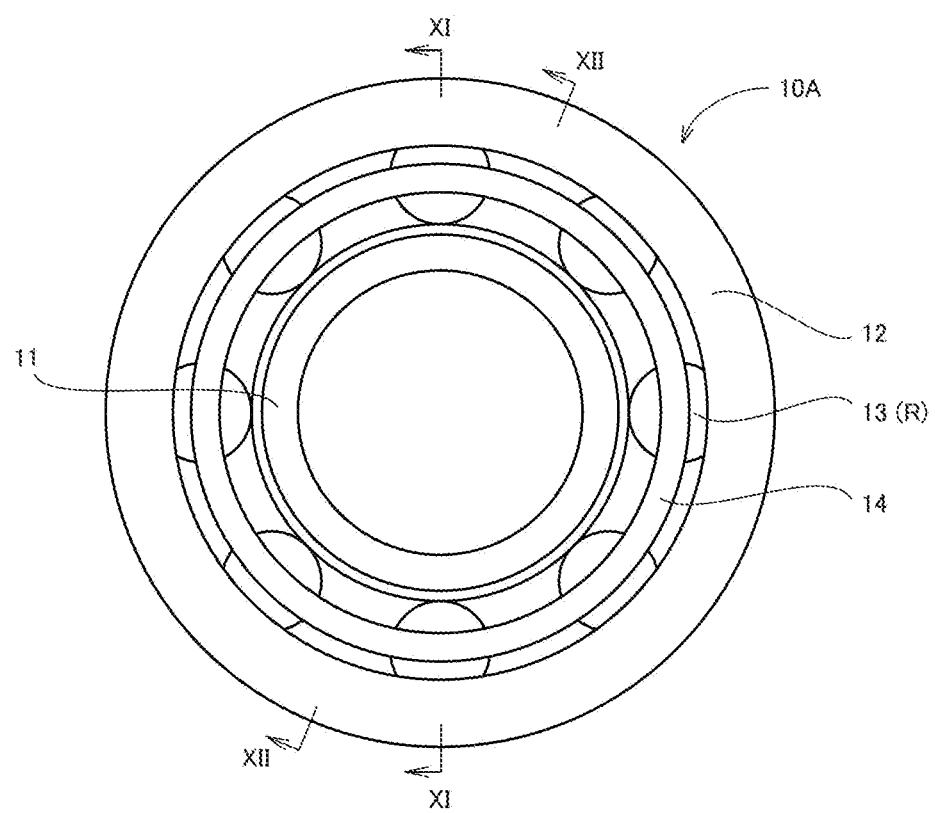
FIG. 10 is a top view of a rolling bearing 10A.
Figure 11:
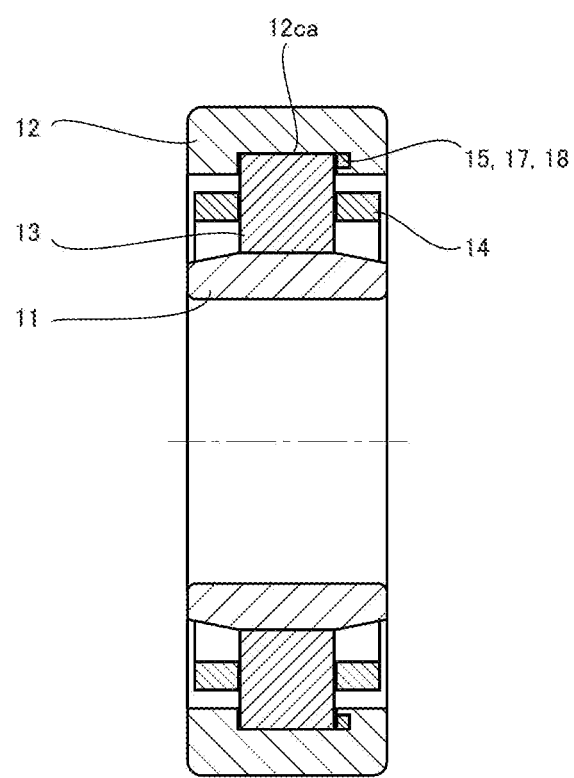
FIG. 11 is a cross-sectional view along line XI-XI in FIG. 10.
Figure 12:
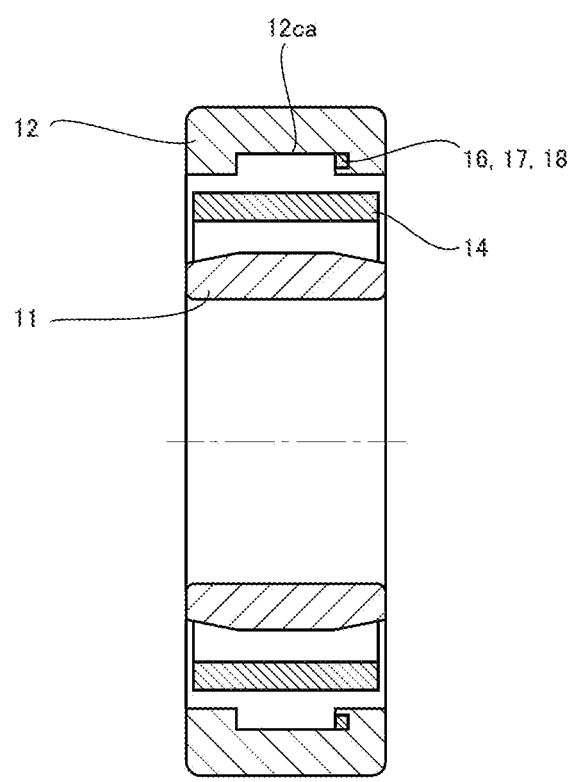
FIG. 12 is a cross-sectional view along line XII-XII in FIG. 10.

FIG. 10 is a top view of rolling bearing 10A. FIG. 11 is a cross-sectional view along line XI-XI in FIG. 10. FIG. 12 is a cross-sectional view along line XII-XII in FIG. 10. As shown in FIG. 10 to FIG. 12, rolling bearing 10A is a cylindrical roller bearing. Rolling bearing 10A includes an inner ring 11, an outer ring 12, rolling elements 13, a cage 14, first electrodes 15, second electrodes 16, an insulating film 17, and an insulating film 18. First electrodes 15 and second electrodes 16 are arranged such that the phase of temporal change of the first distance involved with relative rotation of inner ring 11 to outer ring 12 and the phase of temporal change of the second distance involved with relative rotation of inner ring 11 to outer ring 12 are shifted from each other. In these points, the configuration of rolling bearing 10A is common to the configuration of rolling bearing 10.

In rolling bearing 10A, rolling elements 13 serve as third electrodes R, rather than cage 14. Rolling elements 13 are formed of, for example, a conductive material. In rolling bearing 10A, the first distance is the distance in the center axial direction between rolling element 13 and first electrode 15, and the second distance is the distance in the center axial direction between rolling element 13 and second electrode 16. Cage 14 does not have protrusions 14ba or depressions 14bb. It is preferable that the number of first electrodes 15 and the number of second electrodes 16 are each an integer multiple of the number of rolling elements 13. First electrodes 15 and second electrodes 16 are arranged at a side surface of depression 12ca. Cage 14 is not necessarily formed of a conductive material. In these points, the configuration of rolling bearing 10A is different from the configuration of rolling bearing 10.

In rolling bearing 10A, first electrode 15 (second electrode 16) repeats a state of facing rolling element 13 and a state of not facing rolling element 13 with relative rotation of inner ring 11 to outer ring 12. When rolling element 13 and first electrode 15 (second electrode 16) do not face each other, the first distance (second distance) can be considered as being infinite and, therefore, the first distance and the second distance change with time with relative rotation of inner ring 11 to outer ring 12, even in rolling bearing 10A.

The effect of rolling bearing 10A will be described below. Here, the differences from the effect of rolling bearing 10 will be mainly described and an overlapping description will not be repeated.

Even in rolling bearing 10A, similar to rolling bearing 10, first electrodes 15 and second electrodes 16 are arranged such that the phase of temporal change of the first distance involved with relative rotation of inner ring 11 to outer ring 12 and the phase of temporal change of the second distance involved with relative rotation of inner ring 11 to outer ring 12 are shifted from each other. Therefore, with relative rotation of inner ring 11 to outer ring 12, the voltage between electrodes is generated and current flows between first electrode 15 and second electrode 16. Accordingly, even in rolling bearing 10A, a sensor capable of detecting a state of the rolling bearing and a power generating device can be readily constructed.

Third Embodiment

A configuration of a rolling bearing (hereinafter referred to as "rolling bearing 20") according to a third embodiment will be described below.

Figure 13:
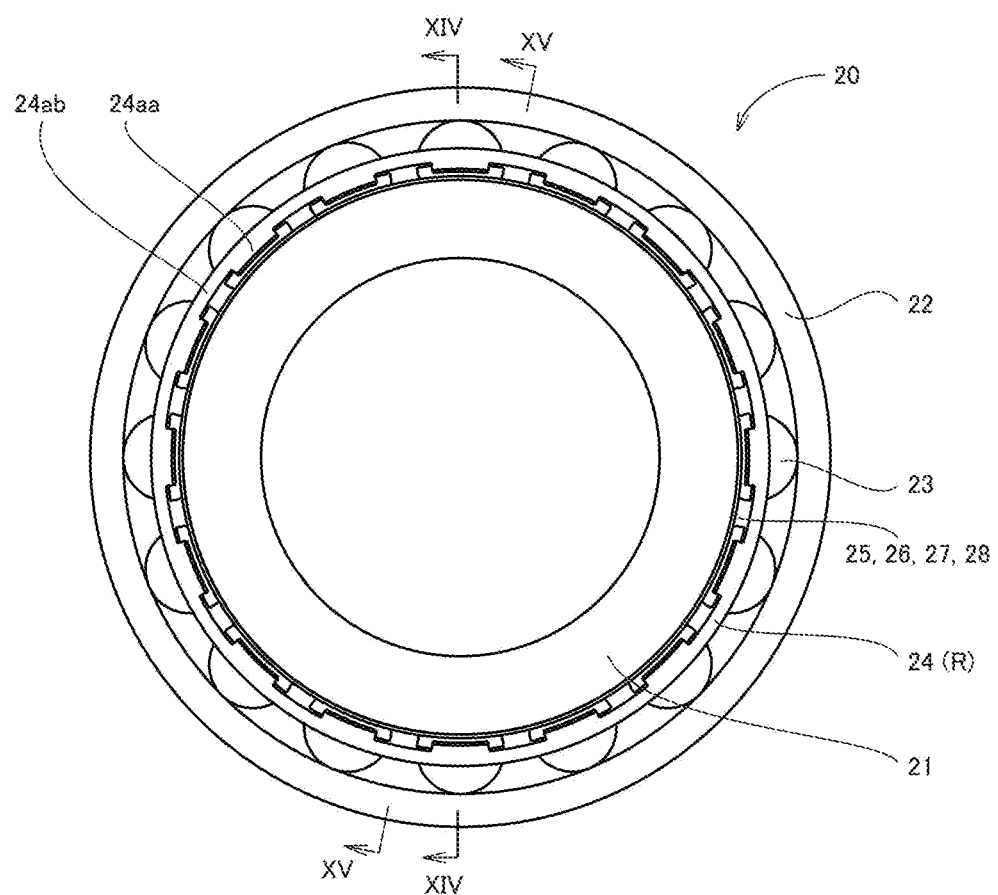
FIG. 13 is a top view of a rolling bearing 20.
Figure 14:
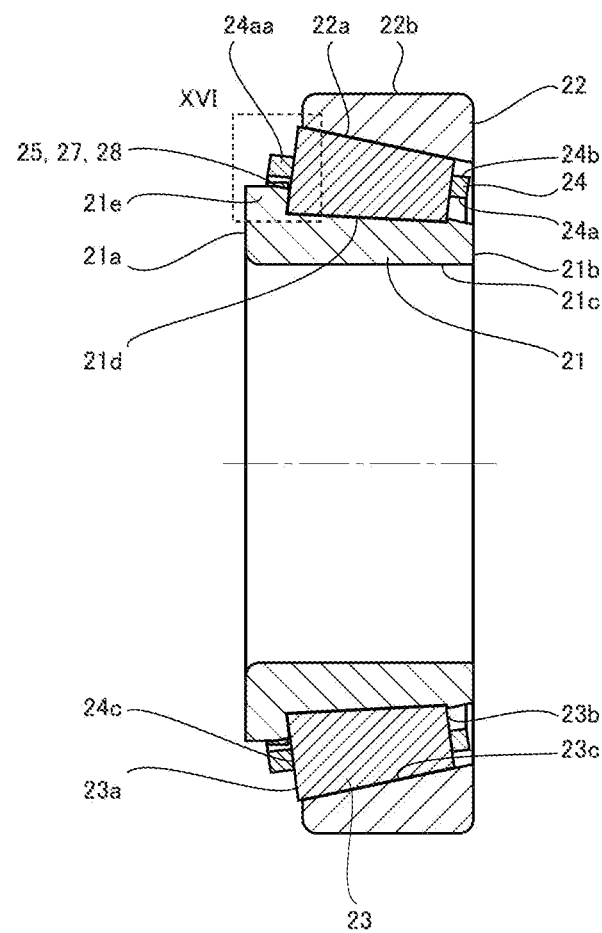
FIG. 14 is a cross-sectional view along line XIV-XIV in FIG. 13.
Figure 15:
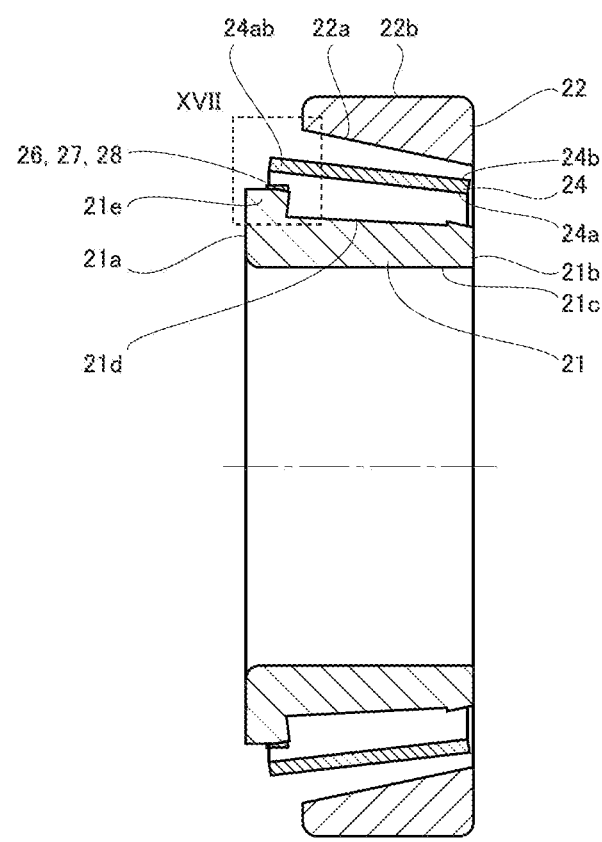
FIG. 15 is a cross-sectional view along line XV-XV in FIG. 13.

FIG. 13 is a top view of rolling bearing 20. FIG. 14 is a cross-sectional view along line XIV-XIV in FIG. 13. FIG. 15 is a cross-sectional view along line XV-XV in FIG. 13. As shown in FIG. 13 to FIG. 15, rolling bearing 20 is a tapered roller bearing. Rolling bearing 20 includes an inner ring 21, an outer ring 22, rolling elements 23, a cage 24, first electrodes 25, second electrodes 26, an insulating film 27, and an insulating film 28 (see FIG. 16 and FIG. 17 for detail).

Inner ring 21 has an annular shape. Inner ring 21 has a top surface 21a, a bottom surface 21b, an inner peripheral surface 21c, and an outer peripheral surface 21d. Top surface 21a and bottom surface 21b form end surfaces in the center axial direction of rolling bearing 20. Outer peripheral surface 21d has a raceway surface of inner ring 21. A flange 21e is formed on the top surface 21a side of outer peripheral surface 21d.

Outer ring 22 has an annular shape. Outer ring 22 has an inner peripheral surface 22a and an outer peripheral surface 22b. Inner peripheral surface 22a has a raceway surface of outer ring 22. Outer ring 22 is arranged on the outside of inner ring 21 such that inner peripheral surface 22a faces outer peripheral surface 21d. Outer ring 22 is attached to a housing (not shown).

Rolling element 23 has a top surface 23a, a bottom surface 23b, and a side surface 23c. The diameter of top surface 23a is larger than the diameter of bottom surface 23b, and side surface 23c is continuous to top surface 23a and bottom surface 23b. Side surface 23c founts a rolling surface of rolling element 23. Rolling element 23 has a truncated conical shape. Rolling element 23 is arranged between inner ring 21 and outer ring 22 such that side surface 23c is in contact with outer peripheral surface 21d and inner peripheral surface 22a. Rolling element 23 is arranged such that top surface 23a faces a side surface of flange 21e.

Cage 24 is a machined cage. Cage 24 serves as third electrodes R. Cage 24 has an annular shape. Cage 24 has an inner peripheral surface 24a, an outer peripheral surface 24b, and through holes 24c. Cage 24 is arranged between inner ring 21 and outer ring 22 such that inner peripheral surface 24a faces outer peripheral surface 21d and that outer peripheral surface 24b faces inner peripheral surface 22a. Through holes 24c each pass through cage 24 along the thickness direction (the direction from inner peripheral surface 24a toward outer peripheral surface 244. The number of through holes 24c is equal to the number of rolling elements 23. Rolling element 23 is arranged in each through hole 24c. Rolling elements 23 are thus retained in cage 24 such that the intervals in the circumferential direction between rolling elements 23 are regular intervals. Cage 24 is formed of, for example, a conductive material.

Inner peripheral surface 24a has protrusions 24aa. Inner peripheral surface 24a protrudes to the opposite side to outer peripheral surface 24b at each protrusion 24aa. It is preferable that the number of protrusions 24aa is equal to the number of rolling elements 13. It is preferable that protrusions 24aa are arranged at regular intervals along the circumferential direction. Inner peripheral surface 24a has depressions 24ab. Inner peripheral surface 24a is recessed toward outer peripheral surface 24b at each depression 24ab. It is preferable that the number of depressions 24ab is equal to the number of rolling elements 23. Depression 24ab is arranged between two protrusions 24aa adjacent to each other. That is, protrusions 24aa and depressions 24ab are alternately formed at regular intervals along the circumferential direction.

First electrodes 25 and second electrodes 26 are formed of a conductive material. First electrodes 25 and second electrodes 26 are formed of, for example, copper or copper alloy. First electrodes 25 and second electrodes 26 are arranged each at a position facing cage 24. More specifically, first electrodes 25 and second electrodes 26 are arranged on outer peripheral surface 21d positioned at flange 21e.

The number of first electrodes 25 and the number of second electrodes 26 are each an integer multiple of the number of protrusions 24aa. As used herein "the number of first electrodes 25 and the number of second electrodes 26 are each an integer multiple of the number of protrusions 24aa" includes a case where the number of first electrodes 25 and the number of second electrodes 26 are each equal to the number of protrusions 24aa. First electrodes 25 and second electrodes 26 are alternately arranged along the circumferential direction. A plurality of first electrodes 25 may be formed integrally, and a plurality of second electrodes 26 may be formed integrally. However, first electrodes 25 are electrically isolated from second electrodes 26.

Cage 24 revolves along the circumferential direction with relative rotation of inner ring 21 to outer ring 22. The distance in the radial direction between third electrode R (in rolling bearing 20, cage 24) and first electrode 25 is referred as a first distance, and the distance in the radial direction between third electrode R and second electrode 26 is referred to as a second distance. Since inner peripheral surface 24a has protrusions 24aa (and depressions 24ab), the first distance and the second distance change with time with relative rotation of inner ring 21 to outer ring 22 (with revolution of cage 24).

First electrodes 25 and second electrodes 26 are arranged such that the phase of temporal change of the first distance involved with relative rotation of inner ring 21 to outer ring 22 and the phase of temporal change of the second distance involved with relative rotation of inner ring 21 to outer ring 22 are shifted from each other.

In rolling bearing 20, protrusions 24aa are arranged at regular intervals along the circumferential direction. Furthermore, in rolling bearing 20, the number of first electrodes 25 and the number of second electrodes 26 are each equal to the number of protrusions 24aa. In addition, in rolling bearing 20, first electrodes 25 and second electrodes 26 are arranged at regular intervals along the circumferential direction. Therefore, in rolling bearing 20, second electrode 26 does not face protrusion 24aa when first electrode 25 faces protrusion 24aa, and first electrode 25 does not face protrusion 24aa when second electrode 26 faces protrusion 24aa. Consequently, the phase of temporal change of the first distance is the opposite phase to the phase of temporal change of the second distance.

Figure 16:
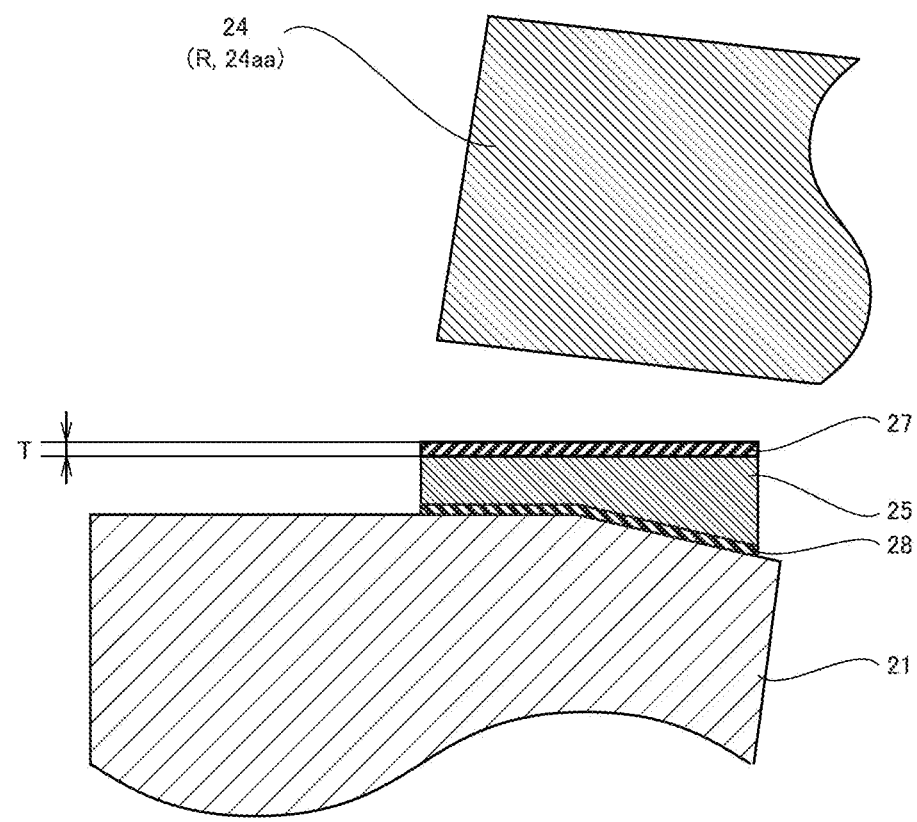
FIG. 16 is an enlarged view of region XVI in FIG. 14.
Figure 17:
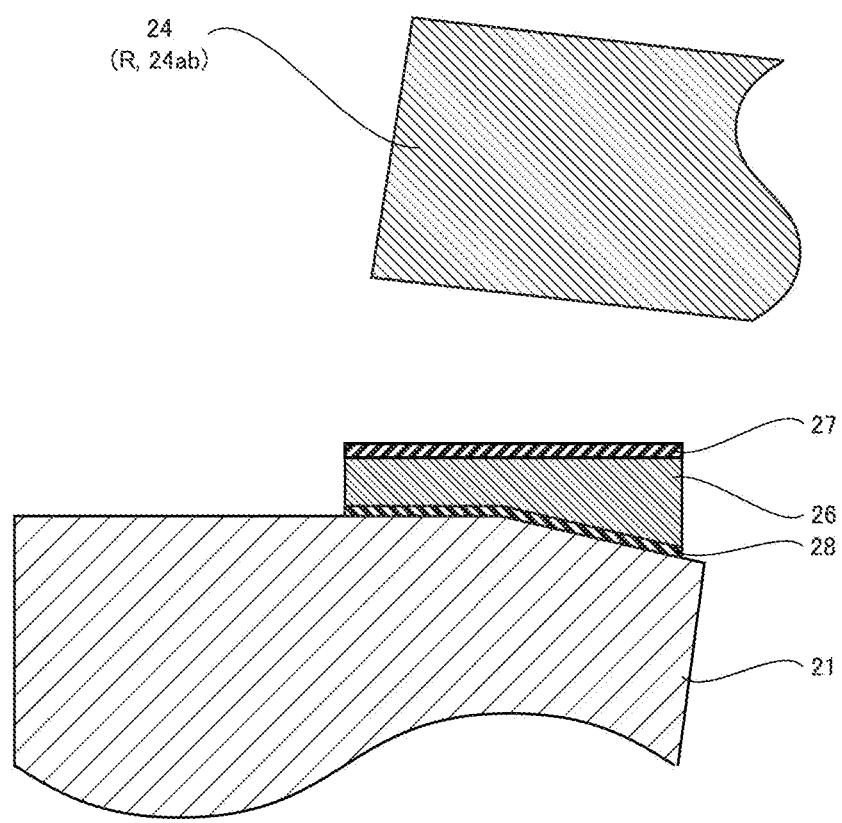
FIG. 17 is an enlarged view of region XVII in FIG. 15.

FIG. 16 is an enlarged view of region XVI in FIG. 14. FIG. 17 is an enlarged view of region XVII in FIG. 15. As shown in FIG. 16 and FIG. 17, insulating film 27 is formed on first electrode 25 and second electrode 26. Insulating film 27 is formed of an insulating material. Insulating film 27 is formed of, for example, polytetrafluoroethylene (insulating film 27 is a polytetrafluoroethylene film). Thickness T of insulating film 27 is preferably equal to or less than 180 µm. Thickness T is further preferably equal to or less than 100 µm. Thickness T is, for example, equal to or more than 12.5 µm. Insulating film 28 is formed between inner ring 21 (more specifically, flange 21e) and each of first electrode 25 and second electrode 26. Insulating film 28 is formed of an insulating material. First electrodes 25 and second electrodes 26 are thus electrically isolated from inner ring 21.

The effect of rolling bearing 20 will be described below.

Even in rolling bearing 20, similar to rolling bearing 10, first electrodes 25 and second electrodes 26 are arranged such that the phase of temporal change of the first distance involved with relative rotation of inner ring 21 to outer ring 22 and the phase of temporal change of the second distance involved with relative rotation of inner ring 11 to outer ring 12 are shifted from each other. Therefore, with relative rotation of inner ring 21 to outer ring 22, the voltage between electrodes is generated and current flows between first electrode 25 and second electrode 26. Accordingly, even in rolling bearing 20, a sensor capable of detecting a state of the rolling bearing and a power generating device can be readily constructed.

Fourth Embodiment

A configuration of a rolling bearing (hereinafter referred to as "rolling bearing 20A") according to a fourth embodiment will be described below. Here, the differences from the configuration of rolling bearing 20 will be mainly described and an overlapping description will not be repeated.

Figure 18:
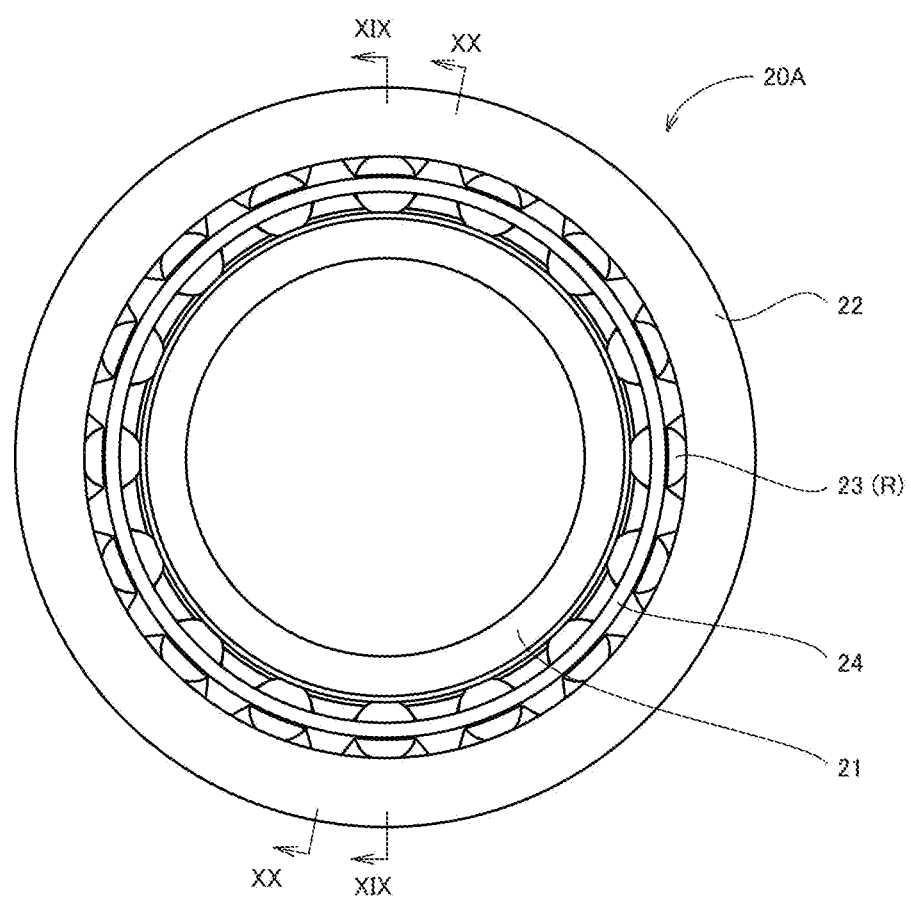
FIG. 18 is a bottom view of a rolling bearing 20A.
Figure 19:
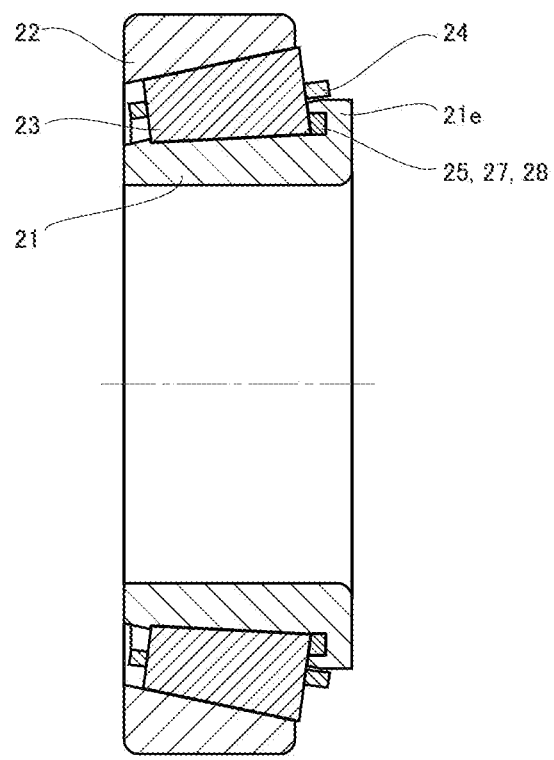
FIG. 19 is a cross-sectional view along line XIX-XIX in FIG. 18.
Figure 20:
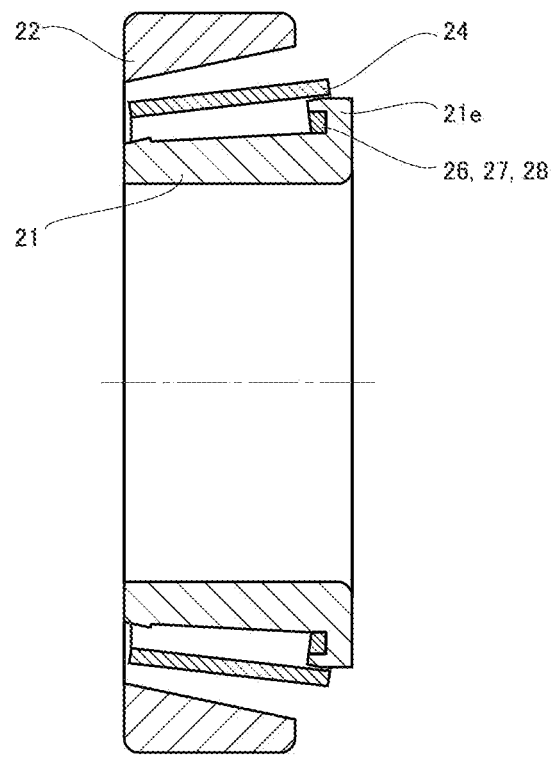
FIG. 20 is a cross-sectional view along line XX-XX in FIG. 18.

FIG. 18 is a bottom view of rolling bearing 20A. FIG. 19 is a cross-sectional view along line XIX-XIX in FIG. 18. FIG. 20 is a cross-sectional view along line XX-XX in FIG. 18. As shown in FIG. 18 to FIG. 20, rolling bearing 20A is a tapered roller bearing. Rolling bearing 20A includes an inner ring 21, an outer ring 22, rolling elements 23, a cage 24, first electrodes 25, second electrodes 26, an insulating film 27, and an insulating film 28. First electrodes 25 and second electrodes 26 are arranged such that the phase of temporal change of the first distance involved with relative rotation of inner ring 21 to outer ring 22 and the phase of temporal change of the second distance involved with relative rotation of inner ring 21 to outer ring 22 are shifted from each other. In these points, the configuration of rolling bearing 20A is common to the configuration of rolling bearing 20.

In rolling bearing 20A, rolling elements 23 serve as third electrodes R, rather than cage 24. The first distance is the distance in the center axial direction between rolling element 23 and first electrode 25. The second distance is the distance in the center axial direction between rolling element 23 and second electrode 16. Rolling elements 23 are formed of, for example, a conductive material. Cage 24 is not necessarily formed of a conductive material. Cage 24 does not have protrusions 24aa or depressions 24ab. It is preferable that the number of first electrodes 25 and the number of second electrodes 26 are each an integer multiple of the number of rolling elements 23. First electrodes 25 and second electrodes 26 are arranged on a side surface of a flange 21e. In these points, the configuration of rolling bearing 20A is different from the configuration of rolling bearing 20.

In rolling bearing 20A, first electrode 25 (second electrode 26) repeats a state of facing rolling element 23 and a state of not facing rolling element 23 with relative rotation of inner ring 21 to outer ring 22. When rolling element 23 and first electrode 25 (second electrode 26) do not face each other, the first distance (second distance) can be considered as being infinite and, therefore, the first distance and the second distance change with time with relative rotation of inner ring 21 to outer ring 22, even in rolling bearing 20A.

The effect of rolling bearing 20A will be described below. Here, the differences from the effect of rolling bearing 20 will be mainly described and an overlapping description will not be repeated.

Even in rolling bearing 20A, similar to rolling bearing 20, first electrodes 25 and second electrodes 26 are arranged such that the phase of temporal change of the first distance involved with relative rotation of inner ring 21 to outer ring 22 and the phase of temporal change of the second distance involved with relative rotation of inner ring 21 to outer ring 22 are shifted from each other. Therefore, with relative rotation of inner ring 21 to outer ring 22, the voltage between electrodes is generated and current flows between first electrode 25 and second electrode 26. Accordingly, even in rolling bearing 20A, a sensor capable of detecting a state of the rolling bearing and a power generating device can be readily constructed.

Fifth Embodiment

A configuration of a rolling bearing (hereinafter referred to as "rolling bearing 30") according to a fifth embodiment will be described below.

Figure 21:
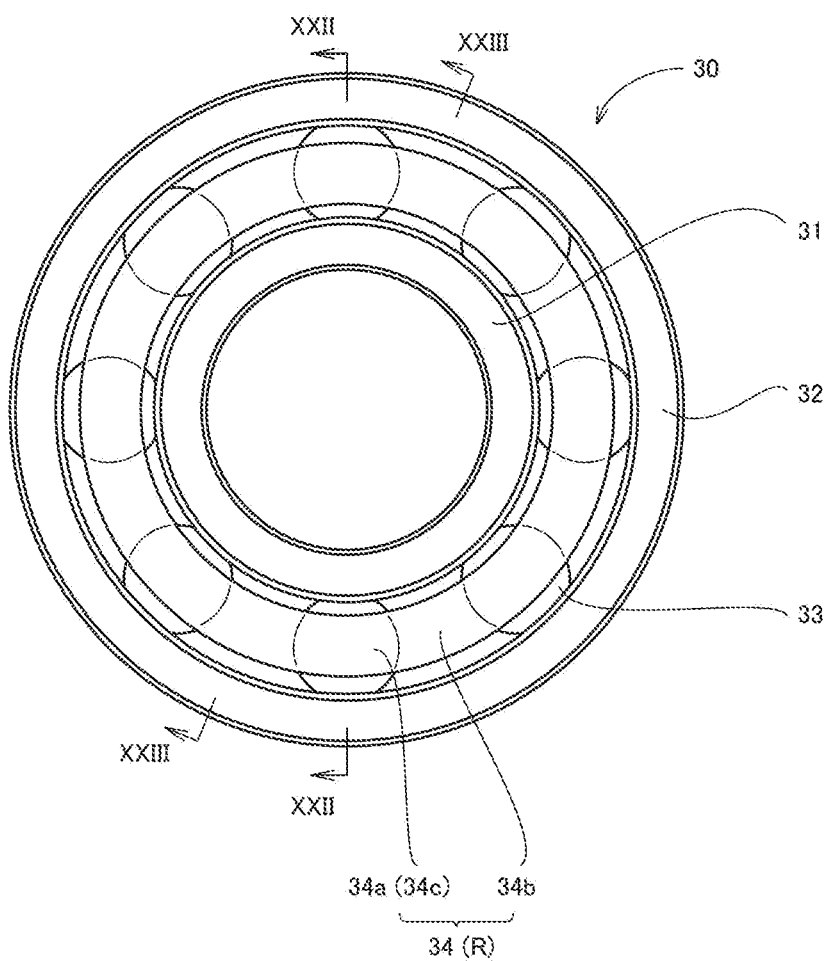
FIG. 21 is a top view of a rolling bearing 30.
Figure 22:
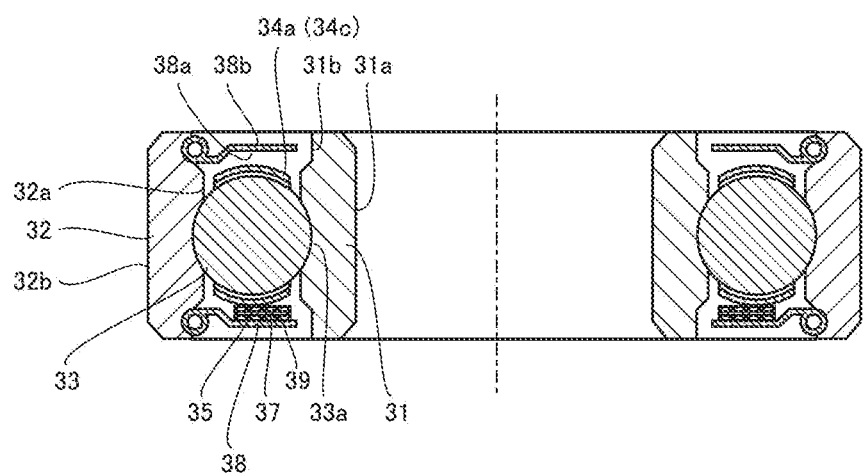
FIG. 22 is a cross-sectional view along line XXII-XXII in FIG. 21.
Figure 23:
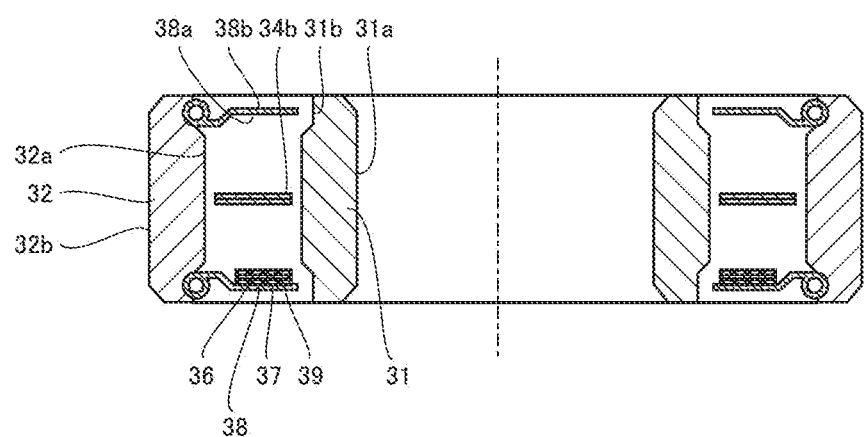
FIG. 23 is a cross-sectional view along line XXIII-XXIII in FIG. 21.

FIG. 21 is a top view of rolling bearing 30. FIG. 22 is a cross-sectional view along line XXII-XXII in FIG. 21. FIG. 23 is a cross-sectional view along line XXIII-XXIII in FIG. 21. As shown in FIG. 21 to FIG. 23, rolling bearing 30 is a ball bearing. Rolling bearing 30 includes an inner ring 31, an outer ring 32, rolling elements 33, a cage 34, first electrodes 35, second electrodes 36, an insulating film 37 and an insulating film 39, and a seal member 38.

Inner ring 31 has an annular shape. Inner ring 31 has an inner peripheral surface 31a and an outer peripheral surface 31b. Outer peripheral surface 31b has a raceway surface of inner ring 31. A shaft is inserted in inner ring 31.

Outer ring 32 has an annular shape. Outer ring 32 has an inner peripheral surface 32a and an outer peripheral surface 32b. Inner peripheral surface 32a has a raceway surface of outer ring 32. Outer ring 32 is arranged on the outside of inner ring 31 such that inner peripheral surface 32a faces outer peripheral surface 31b.

Rolling element 33 has a ball-like shape. Rolling element 33 has a surface 33a. Rolling element 33 is arranged between inner ring 31 and outer ring 32 such that surface 33a is in contact with outer peripheral surface 31b and inner peripheral surface 32a.

Cage 34 is a pressed cage in which a steel sheet is punched to form portions for retaining rolling elements 33. Cage 34 has retaining portions 34a and coupling portions 34b. Retaining portions 34a and coupling portions 34b are alternately arranged at regular intervals along the circumferential direction. Retaining portion 34a is a portion for retaining rolling element 33. Coupling portion 34b is a portion coupling two retaining portions 34a adjacent to each other in the circumferential direction. Cage 34 has a protrusion 34c projecting along the center axial direction at the portion for retaining rolling element 33. In the example shown in FIG. 21 to FIG. 23, retaining portion 34a is a curved surface conforming to surface 33a of rolling element 33, and the curved surface portion is protrusion 34c per se. A portion projecting along the center axial direction may be further formed near the vertex of the curved surface portion for retaining rolling element 33, for example, by press working, and the projecting portion may serve as protrusion 34c. The press working may be performed simultaneously with the punching for forming retaining portions 34a. That is, "cage 34 has protrusion 34c projecting along the center axial direction at the portion for retaining rolling element 33" includes both of a case where retaining portion 34a is protrusion 34c per se and a case where protrusion 34c is formed at retaining portion 34a. The number of protrusions 34c is equal to the number of rolling elements 33. Cage 34 serves as third electrodes R. Cage 34 has an annular shape. Rolling elements 33 are retained in cage 34 such that the intervals in the circumferential direction between rolling elements 33 are regular intervals. Cage 34 is formed of a conductive material.

Seal member 38 is attached to outer ring 32 such that a bearing space is defined between inner ring 31 and outer ring 32. Seal member 38 may be a seal plate or may be a shielding plate. Seal member 38 has a front surface 38a and a back surface 38b. Front surface 38a is a surface directed toward the bearing space. To put this in a different way, front surface 38a is a surface on the side facing cage 34. Back surface 38b is the opposite surface to front surface 38a.

First electrode 35 and second electrode 36 are arranged on seal member 38. More specifically, first electrode 35 and second electrode 36 are arranged on front surface 38a. It is preferable that the number of first electrodes 35 and the number of second electrodes 36 are each an integer multiple of the number of rolling elements 33. As used herein "the number of first electrodes 35 and the number of second electrodes 36 are each an integer multiple of the number of rolling elements 33" includes a case where the number of first electrodes 35 and the number of second electrodes 36 are each equal to the number of rolling elements.

First electrodes 35 and second electrodes 36 are alternately arranged along the circumferential direction. A plurality of first electrodes 35 may be formed integrally, and a plurality of second electrodes 36 may be formed integrally. However, first electrodes 35 are electrically isolated from second electrodes 36.

Cage 34 revolves along the circumferential direction with relative rotation of inner ring 31 to outer ring 32. The distance in the center axial direction between third electrode R (in rolling bearing 30, cage 34) and first electrode 35 is referred as a first distance, and the distance in the center axial direction between third electrode R and second electrode 36 is referred to as a second distance. Since cage 34 is a pressed cage (having protrusions 34c), first electrode 35 (second electrode 36) repeats a state of facing protrusion 34c and a state of not facing protrusion 34c with relative rotation of inner ring 31 to outer ring 32 (that is, with revolution of cage 34), and the first distance and the second distance change with time.

First electrodes 35 and second electrodes 36 are arranged such that the phase of temporal change of the first distance involved with relative rotation of inner ring 31 to outer ring 32 and the phase of temporal change of the second distance involved with relative rotation of inner ring 31 to outer ring 32 are shifted from each other.

In rolling bearing 30, rolling elements 33 are arranged at regular intervals along the circumferential direction. Furthermore, in rolling bearing 30, cage 34 is a pressed cage. In addition, in rolling bearing 30, the number of first electrodes 25 and the number of second electrodes 26 are each an integer multiple of the number of rolling elements 33, and first electrodes 35 and second electrodes 36 are arranged at regular intervals along the circumferential direction. Therefore, in rolling bearing 30, since second electrode 36 does not face rolling element 33 when first electrode 35 faces rolling element 33, the first distance increases while the second distance decreases. On the other hand, since first electrode 35 does not face rolling element 33 when second electrode 36 faces rolling element 33, the second distance increases while the first distance decreases. In this way, in rolling bearing 30, the phase of temporal change of the first distance is the opposite phase to the phase of temporal change of the second distance.

Insulating film 37 is formed on first electrodes 35 and second electrodes 36. Insulating film 37 is formed of an, insulating material. Insulating film 37 is formed of, for example, polytetrafluoroethylene (insulating film 37 is a polytetrafluoroethylene film). Thickness T of insulating film 37 is preferably equal to or less than 180 μm. Thickness T is further preferably equal to or less than 100 μm. Thickness T is, for example, equal to or more than 12.5 μm. Insulating film 39 is formed between seal member 38 (more specifically, front surface 38a) and each of first electrode 35 and second electrode 36. Insulating film 39 is formed of an insulating material. First electrodes 35 and second electrodes 36 are thus electrically isolated from seal member 38.

The effect of rolling bearing 30 will be described below.

Even in rolling bearing 30, similar to rolling bearing 10, first electrodes 35 and second electrodes 36 are arranged such that the phase of temporal change of the first distance involved with relative rotation of inner ring 31 to outer ring 32 and the phase of temporal change of the second distance involved with relative rotation of inner ring 31 to outer ring 32 are shifted from each other. Therefore, with relative rotation of inner ring 31 to outer ring 32, the voltage between electrodes is generated and current flows between first electrode 35 and second electrode 36. Accordingly, even in rolling bearing 30, a sensor capable of detecting a state of the rolling bearing and a power generating device can be readily constructed.

<Modifications>

Figure 24:
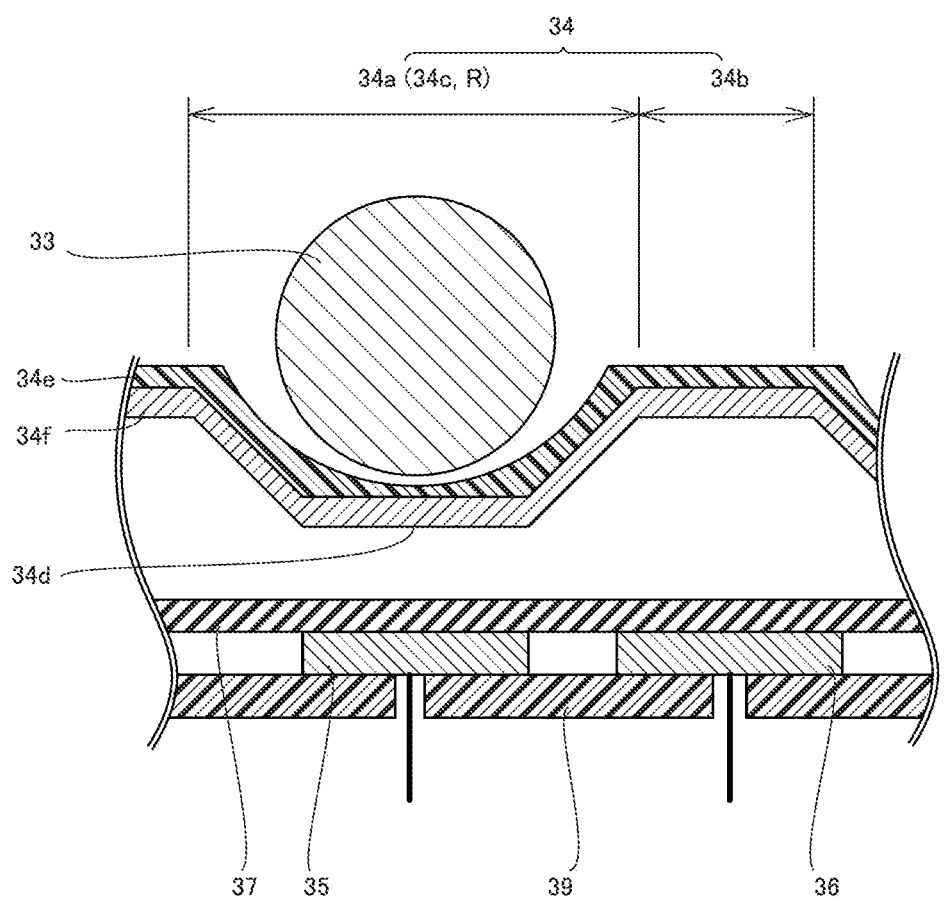
FIG. 24 is a schematic cross-sectional view of a modification of rolling bearing 30.

A modification of rolling bearing 30 will be described below. FIG. 24 is a schematic cross-sectional view of a modification of rolling bearing 30. In FIG. 24, only half of cage 34 on the first electrode 35 and second electrode 36 side is shown. As shown in FIG. 24, retaining portion 34a (protrusion 34c) has an end surface 34d at its distal end (an end on the first electrode 35 and second electrode 36 side). End surface 34d is parallel to the surface of first electrode 35 and the surface of second electrode 36.

It is preferable that the width in the circumferential direction of end surface 34d is equal to the width in the circumferential direction of first electrode 35 and the width in the circumferential direction of second electrode 36. Furthermore, it is preferable that the width in the radial direction of end surface 34d is equal to the width in the radial direction of first electrode 35 and the width in the radial direction of second electrode 36.

In the modification of rolling bearing 30, since the area where first electrode 35 (second electrode 36) faces third electrode R is increased, the amount of electricity generated can be increased. Furthermore, in the modification of rolling bearing 30, as a result of the increased area where first electrode 35 (second electrode 36) faces third electrode R, the contact force per unit area between first electrode 35 (second electrode 36) and third electrode R is reduced, thereby suppressing wearing of the electrodes and insulating film 37.

Cage 34 is formed with a first member 34e and a second member 34f. First member 34e is arranged closer to rolling element 33 than second member 34f. First member 34e is integrated with second member 34f. The surface closer to rolling element 33 of first member 34e positioned at retaining portion 34a has a shape conforming to rolling element 33 so as to retain rolling element 33. End surface 34d is formed at a portion of second member 34f positioned at retaining portion 34a. In this way, in the modification of rolling bearing 30, since the surface closer to rolling element 33 of first member 34e positioned at retaining portion 34a has a shape conforming to the shape of rolling element 33, retaining portion 34a (protrusion 34c) even having end surface 34d parallel to first electrode 35 and second electrode 36 can retain rolling element 33.

Sixth Embodiment

A configuration of a rolling bearing (hereinafter referred to as "rolling bearing 40") according to a sixth embodiment will be described below.

Figure 25:
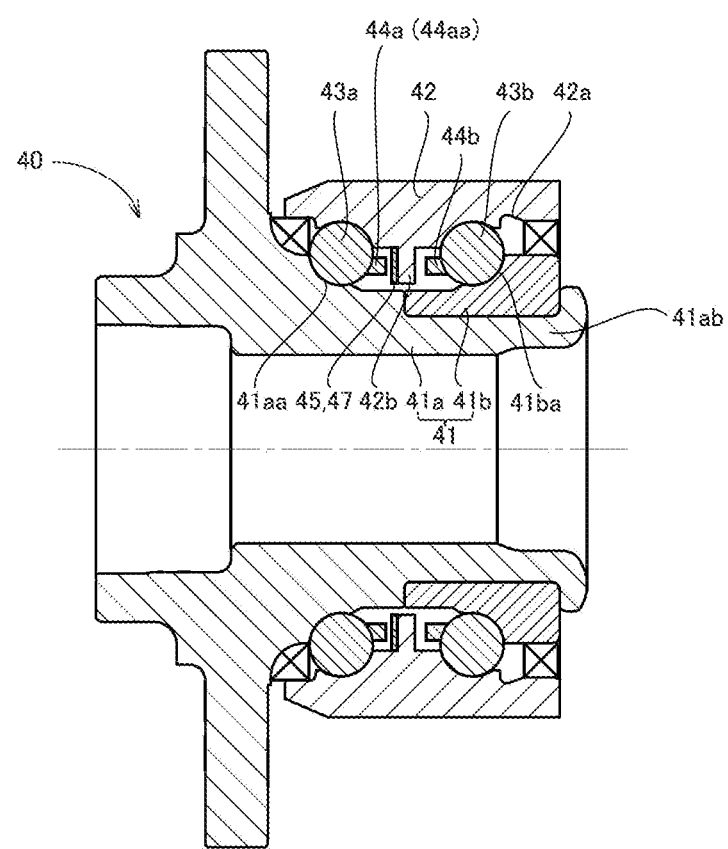
FIG. 25 is a cross-sectional view of a rolling bearing 40.
Figure 26:
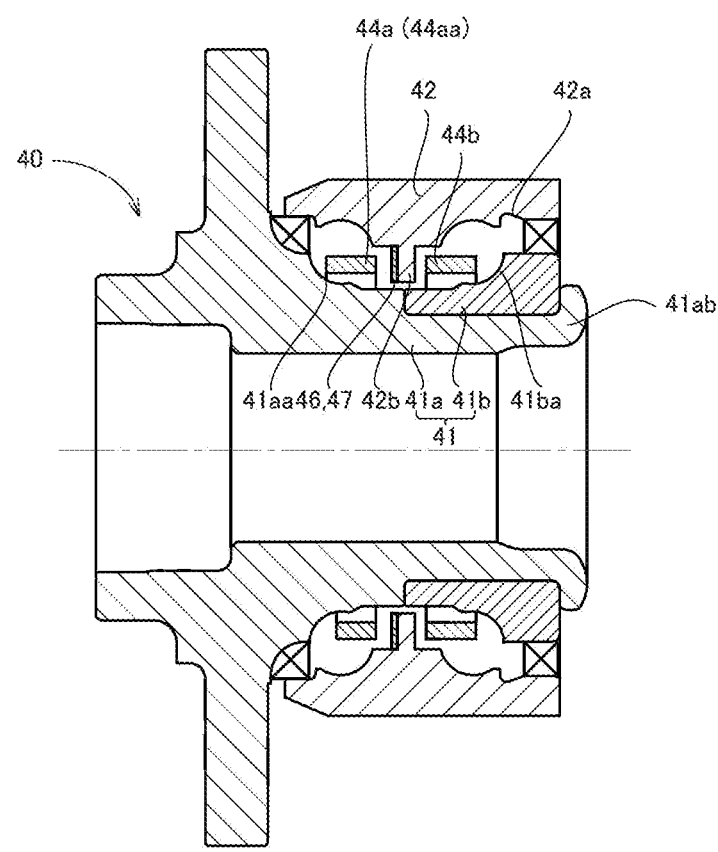
FIG. 26 is a cross-sectional view of rolling bearing 40 in a state in which an inner member 41 rotates relative to an outer member 42.

FIG. 25 is a cross-sectional view of rolling bearing 40. FIG. 26 is a cross-sectional view of rolling bearing 40 in a state in which an inner member 41 rotates relative to an outer member 42. As shown in FIG. 25 and FIG. 26, rolling bearing 40 is a hub bearing. Rolling bearing 40 includes inner member 41, outer member 42 (outer ring), rolling elements 43a and rolling elements 43b, a cage 44a and a cage 44b, first electrodes 45, second electrodes 46, and an insulating film 47.

Inner member 41 includes a hub ring 41a and an inner ring 41b. An outer peripheral surface of hub ring 41a has a raceway surface 41aa. Hub ring 41a has a small diameter portion 41ab. The outer peripheral surface of hub ring 41a is recessed toward the inner peripheral surface of hub ring 41a at small diameter portion 41ab. Small diameter portion 41ab is inserted so that inner ring 41b is fixed to hub ring 41a. An outer peripheral surface of inner ring 41b has a raceway surface 41ba.

Outer member 42 has an inner peripheral surface 42a. Outer member 42 is arranged on the outside of inner member 41 such that inner peripheral surface 42a faces raceway surface 41aa and raceway surface 41ba. Inner peripheral surface 42a has a raceway surface of outer member 42.

Rolling element 43a is arranged between raceway surface 41aa and inner peripheral surface 42a, and rolling element 43b is arranged between raceway surface 41ba and inner peripheral surface 42a. Outer member 42 has a projection 42b at inner peripheral surface 42a. Projection 42b projects from inner peripheral surface 42a toward inner member 41 along the radial direction between rolling element 43a and rolling element 43b.

Cage 44a serves as third electrodes R. Cage 44a has an annular shape. Cage 44a is formed of a conductive material. Rolling elements 43a are retained in cage 44a such that the intervals in the circumferential direction between rolling elements 43a are regular intervals. Cage 44a has protrusions 44aa. A plurality of protrusions 44aa are formed at regular intervals along the circumferential direction. Protrusion 44aa is formed so as to project toward projection 42b on a surface of cage 44a facing projection 42b. Cage 44b retains rolling elements 43b such that the intervals in the circumferential direction between rolling elements 43b are regular intervals.

First electrodes 45 and second electrodes 46 are formed of a conductive material. First electrodes 45 and second electrodes 46 are formed of, for example, copper or copper alloy. First electrodes 45 and second electrodes 46 are arranged each at a position facing cage 44a. More specifically, first electrodes 45 and second electrodes 46 are arranged on projections 42b. The number of first electrodes 45 and the number of second electrodes 46 are each an integer multiple of the number of protrusions 44aa. First electrodes 45 and second electrodes 46 are alternately arranged along the circumferential direction. A plurality of first electrodes 45 may be formed integrally, and a plurality of second electrodes 46 may be formed integrally. However, first electrodes 45 are electrically isolated from second electrodes 46. Although not shown in the drawings, first electrode 45 and second electrode 46 are electrically insulated from projection 42b by an insulating film formed between each of them and projection 42b.

Cage 44a revolves along the circumferential direction with relative rotation of inner member 41 to outer member 42. The distance in the center axial direction between third electrode R (in rolling bearing 40, cage 44a) and first electrode 45 is referred as a first distance, and the distance in the center axial direction between third electrode R and second electrode 16 is referred to as a second distance. Since protrusion 44aa is formed on a surface facing projection 42b of cage 44a, the first distance and the second distance change with time with relative rotation of inner member 41 to outer member 42 (with revolution of cage 44a).

First electrodes 45 and second electrodes 46 are arranged such that the phase of temporal change of the first distance involved with relative rotation of inner member 41 to outer member 42 and the phase of temporal change of the second distance involved with relative rotation of inner member 41 to outer member 42 are shifted from each other.

In rolling bearing 40, protrusions 44aa are arranged at regular intervals along the circumferential direction. Furthermore, in rolling bearing 40, the number of first electrodes 45 and the number of second electrodes 46 are each equal to the number of protrusions 44aa, and first electrodes 45 and second electrodes 46 are arranged at regular intervals along the circumferential direction. Therefore, in rolling bearing 40, second electrode 46 does not face protrusion 44aa when first electrode 45 faces protrusion 44aa, and first electrode 45 does not face protrusion 44aa when second electrode 46 faces protrusion 44aa. Consequently, the phase of temporal change of the first distance is the opposite phase to the phase of temporal change of the second distance.

Insulating film 47 is formed on first electrode 45 and second electrode 46. insulating film 47 is formed of an insulating material. Insulating film 47 is formed of, for example, polytetrafluoroethylene (insulating film 47 is a polytetrafluoroethylene film).

The effect of rolling bearing 40 will be described below.

Even in rolling bearing 40, similar to rolling bearing 10, first electrodes 45 and second electrodes 46 are arranged such that the phase of temporal change of the first distance involved with relative rotation of inner member 41 to outer member 42 and the phase of temporal change of the second distance involved with relative rotation of inner member 41 to outer member 42 are shifted from each other. Therefore, with relative rotation of inner member 41 to outer member 42, the voltage between electrodes is generated and current flows between first electrode 45 and second electrode 46.

Accordingly, even in rolling bearing 40, a sensor capable of detecting a state of the rolling bearing and a power generating device can be readily constructed.

(Application to Other Rolling Bearings)

In a rolling bearing for railway cars using a double-row cylindrical roller bearing and a rolling bearing for railway cars using a double-row tapered roller bearing, the first electrodes, the second electrodes, the insulating film, and the third electrodes described in the first embodiment to sixth embodiment can be applied to construct a rolling bearing that operates similarly to rolling bearing 10 to rolling bearing 40.

Seventh Embodiment

A configuration of a rolling bearing (hereinafter referred to as "rolling bearing 50") according to a seventh embodiment will be described below. Here, the differences from rolling bearing 30 will be mainly described and an overlapping description will not be repeated.

Figure 27:
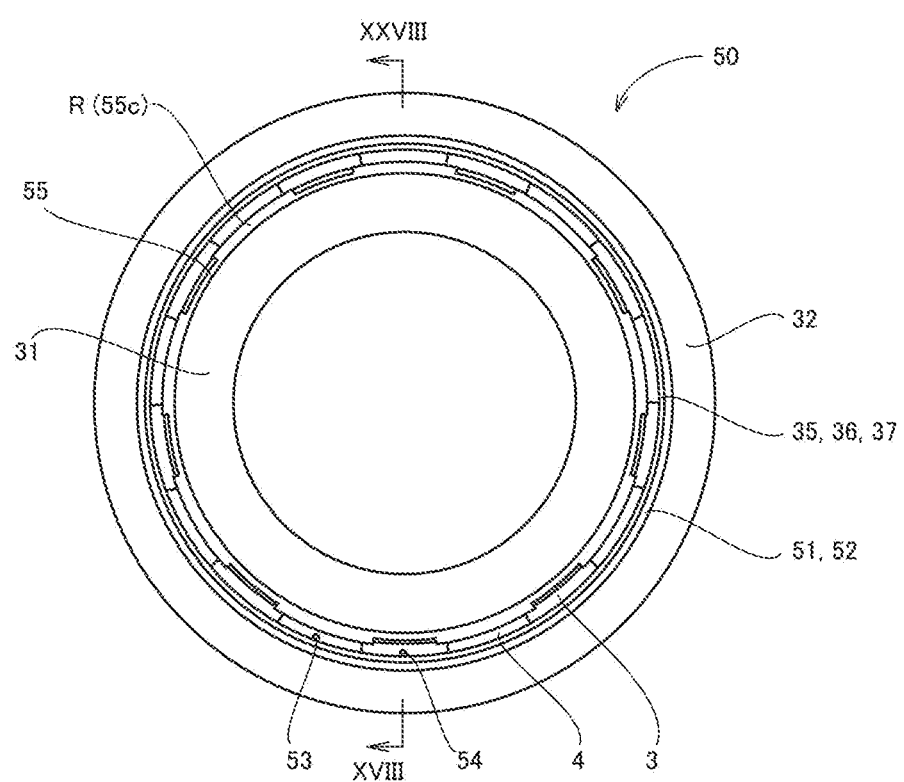
FIG. 27 is a top view of a rolling bearing 50.
Figure 28:
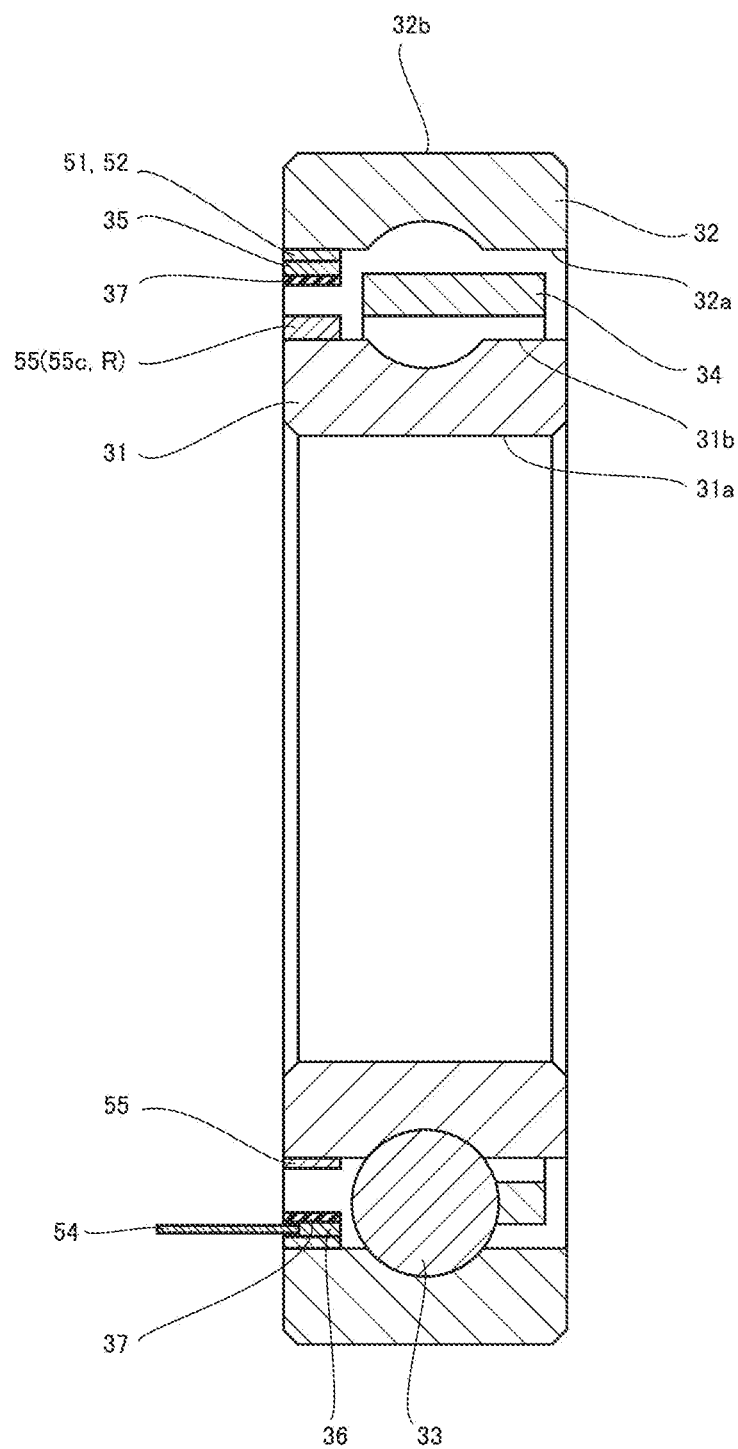
FIG. 28 is a cross-sectional view along line XXVIII-XXVIII in FIG. 27.

FIG. 27 is a top view of rolling bearing 50. FIG. 28 is a cross-sectional view along line XXVIII-XXVIII in FIG. 27. As shown in FIG. 27 and FIG. 28, rolling bearing 50 includes an inner ring 31, an outer ring 32, rolling elements 33, and a cage 34. Rolling bearing 50 further includes first electrodes 35 and second electrodes 36, an insulating film 37, and third electrodes R.

Figure 29:
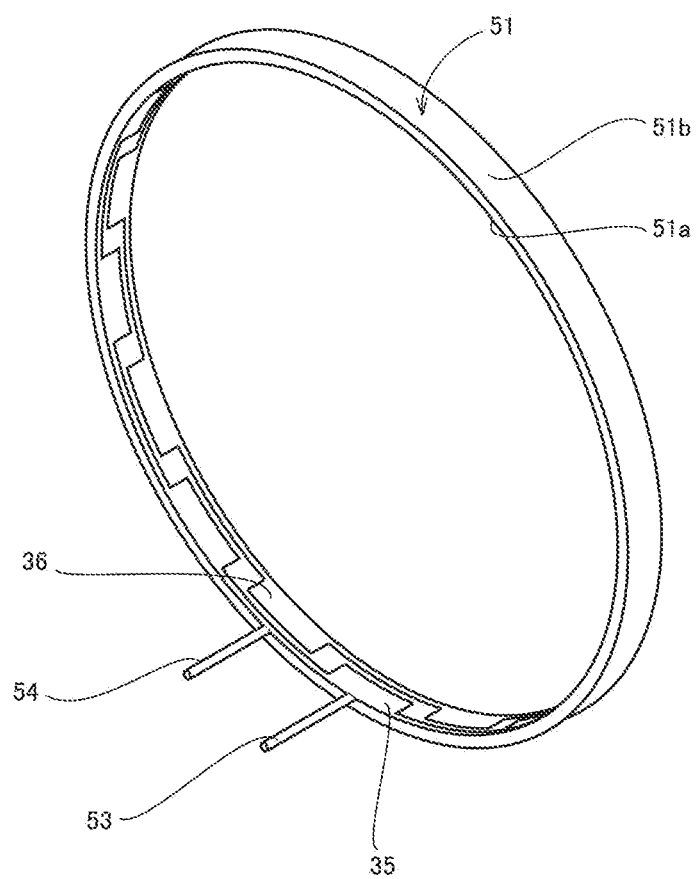
FIG. 29 is a perspective view of a substrate 51 in rolling bearing 50.
Figure 30:
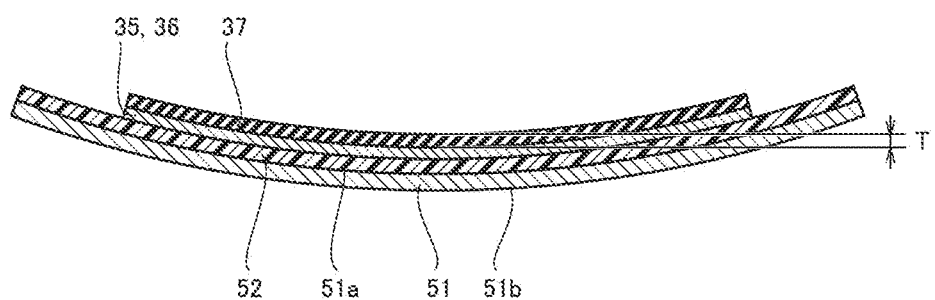
FIG. 30 is a cross-sectional view of substrate 51 in rolling bearing 50.

In rolling bearing 50, rolling elements 33 are balls. FIG. 29 is a perspective view of a substrate 51 in rolling bearing 50. In FIG. 29, insulating film 37 is not illustrated. FIG. 30 is a cross-sectional view of substrate 51 in rolling bearing 50. As shown in FIG. 29 and FIG. 30, first electrodes 35 and second electrodes 36 are formed on substrate 51. Substrate 51 has an annular shape.

Substrate 51 has an inner peripheral surface 51a and an outer peripheral surface 51b. First electrodes 35 and second electrodes 36 are formed on inner peripheral surface 51a. More specifically, a substrate 52 is formed on inner peripheral surface 51a, and first electrodes 35 and second electrodes 36 are formed on substrate 52. Substrate 52 is formed of a resin material such as polyimide, and first electrodes 35 and second electrodes 36 are formed of, for example, a copper (Cu) foil. First electrodes 35 and second electrodes 36 are formed by affixing a copper foil on substrate 52 and patterning the copper foil. That is, first electrodes 35 and second electrodes 36 can be formed by a method similar to that for flexible circuit boards.

First electrodes 35 and second electrodes 36 may be formed directly on inner peripheral surface 51a, for example, by plating, without substrate 52 interposed. When first electrodes 35 and second electrodes 36 are formed without substrate 52 interposed, substrate 51 is formed of an insulating material.

Substrate 51 is attached to inner peripheral surface 32a at outer peripheral surface 51b. Thus, first electrodes 35 and second electrodes 36 are attached to outer ring 32 in the interior of the rolling bearing, and their positions relative to outer ring 32 are fixed.

A lead-out wire 53 and a lead-out wire 54 are electrically connected to first electrode 35 and second electrode 36, respectively. Lead-out wire 53 and lead-out wire 54 are connected to a not-shown power storage unit such as an electric double layer capacitor or a secondary battery.

As shown in FIG. 30, insulating film 37 is formed on surfaces of first electrode 35 and second electrode 36. Insulating film 37 is, for example, a polytetrafluoroethylene (PTFE) film. Insulating film 37 may be a diamond-like carbon (DLC) film. Insulating film 37 has thickness T. Thickness T is preferably equal to or less than 100 μm. Insulating film 37 is formed by immersion in a liquid material or by coating of a liquid material and curing of the liquid material. Insulating film 37 may be formed by affixing sheet-like insulating film 37 on first electrode 35 and second electrode 36.

Figure 31:
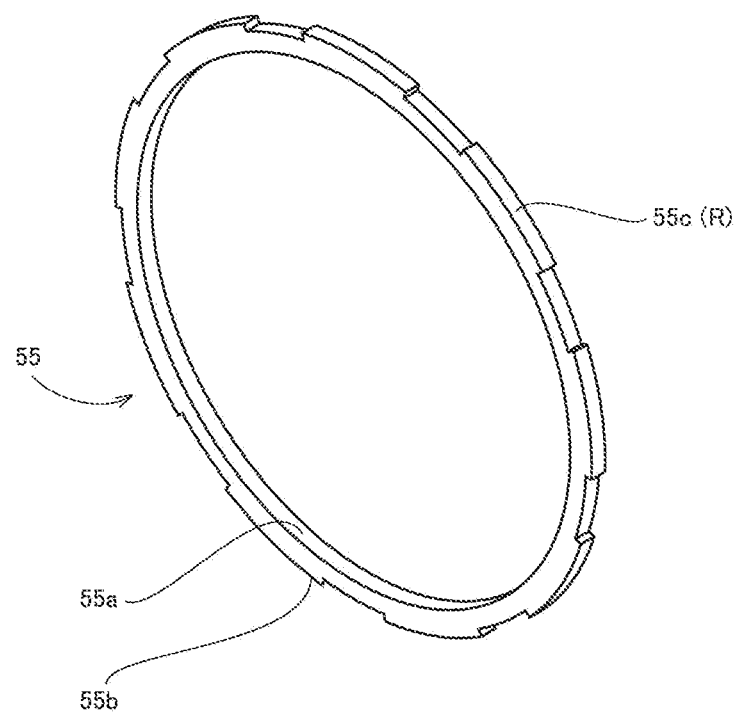
FIG. 31 is a perspective view of an annular member 55 in rolling bearing 50.

Rolling bearing 50 has an annular member 55. Annular member 55 has an annular shape. Annular member 55 is formed of a conductive material. FIG. 31 is a perspective view of annular member 55 in rolling bearing 50. As shown in FIG. 31, annular member 55 has an inner peripheral surface 55a and an outer peripheral surface 55b. Annular member 55 is attached to outer peripheral surface 31b such that inner peripheral surface 55a faces first electrodes 35 and second electrodes 36 with insulating film 37 interposed.

Outer peripheral surface 55b has protrusions 55c. Protrusion 55c projects toward the opposite side to inner peripheral surface 55a. Protrusion 55c forms third electrode R. A plurality of protrusions 55c are provided. It is preferable that the number of protrusions 55c is equal to the number of first electrodes 35 and the number of second electrodes 36. Protrusions 55c are arranged at regular intervals along the circumferential direction.

As described above, since annular member 55 having protrusions 55c (third electrodes R) is attached to inner ring 31, the positions of protrusions 55c (third electrodes R) relative to inner ring 31 are fixed, and third electrodes R are arranged in the interior of rolling bearing.

With rotation of inner ring 31, first electrode 35 (second electrode 36) repeats a state of facing protrusion 55c (third electrode R) and a state of not facing protrusion 55c. The first distance and the second distance therefore change with time with rotation of inner ring 31. The phase of temporal change of the first distance and the phase of temporal change of the second distance are shifted from each other. More specifically, in rolling bearing 50, the number of first electrodes 35 and the number of second electrodes 36 are equal to the number of third electrodes R (protrusions 55c), first electrodes 35 and second electrodes 36 are alternately arranged at regular intervals along the circumferential direction, and third electrodes R (protrusions 55c) are arranged at regular intervals along the circumferential direction. Accordingly, the phase of temporal change of the first distance and the phase of temporal change of the second distance are opposite phases. In rolling bearing 50, the first distance is the distance between first electrode 35 and third electrode R in the radial direction, and the second distance is the distance between second electrode 36 and third electrode R in the radial direction.

The effect of rolling bearing 50 will be described below.

As described above, in rolling bearing 50, the first distance and the second distance change with time with rotation of inner ring 31, and the phase of temporal change of the first distance and the phase of temporal change of the second distance are shifted from each other. Therefore, electricity is generated in first, electrodes 35 and second electrodes 36. Since all of first electrodes 35, second electrodes 36, insulating film 37, and third electrodes R, which are components for generating electricity, are arranged in the interior of the bearing, rolling bearing 50 has a power generating function incorporated in the bearing interior.

<First Modification>

A first modification of rolling bearing 50 will be described below.

Figure 32:
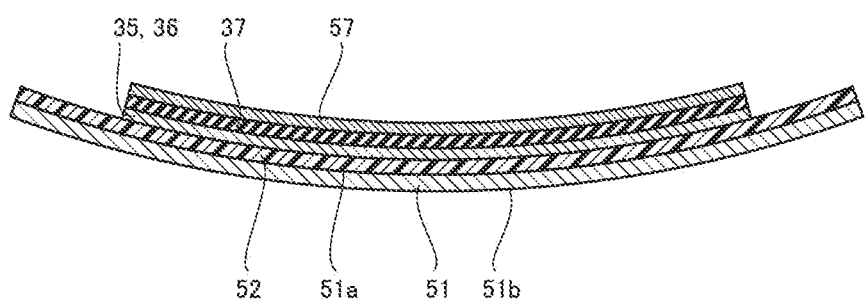
FIG. 32 is an enlarged cross-sectional view of substrate 51 in a first modification of rolling bearing 50.

FIG. 32 is an enlarged cross-sectional view of substrate 51 in the first modification of rolling bearing 50. As shown in FIG. 32, a coating film 57 is formed on insulating film 37. Coating film 57 is formed of, for example, a nickel alloy film. The nickel alloy film is a film formed of an alloy containing nickel. Coating film 57 may be formed of DLC. Although an example of coating film 57 formed on insulating film 37 has been described, coating film 57 may be formed on third electrodes R (protrusions 55c) or may be formed both on insulating film 37 and on third electrodes R. The first modification can improve wear resistance.

<Second Modification>

A second modification of rolling bearing 50 will be described below.

Figure 33:
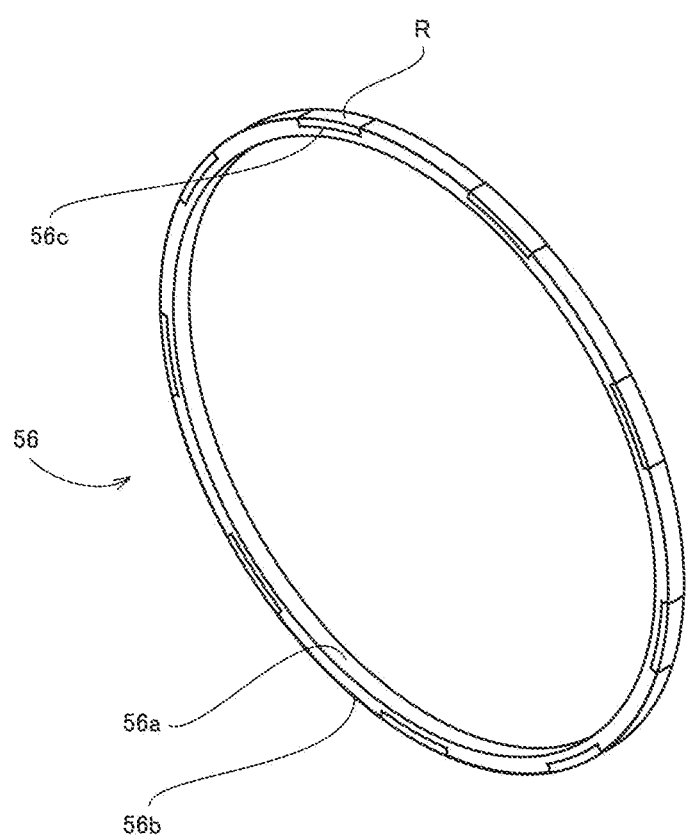
FIG. 33 is a perspective view of an annular member 56 in a second modification of rolling bearing 50.

In the second modification, an annular member 56 is used in place of annular member 55. Annular member 56 has an annular shape. Annular member 56 is formed of an insulating material. FIG. 33 is a perspective view of annular member 56 in the second modification of rolling bearing 50. As shown in FIG. 33, annular member 56 has an inner peripheral surface 56a and an outer peripheral surface 56b. Annular member 56 is attached to outer peripheral surface 32b such that inner peripheral surface 56a faces first electrodes 35 and second electrodes 36 with insulating film 37 interposed.

Outer peripheral surface 56b has depressions 56c. Depressions 56c are recessed toward inner peripheral surface 56a. A plurality of depressions 56c are provided. It is preferable that the number of depressions 56c is equal to the number of first electrodes 35 and the number of second electrodes 36. Depressions 56c are arranged at regular intervals along the circumferential direction. A conductive material is formed as third electrode R in each depression 56c. As described above, since annular member 56 is attached to inner ring 31, the positions of depressions 56c (third electrodes R) relative to inner ring 31 are fixed, and third electrodes R are arranged in the interior of the rolling bearing.

<Third Modification>

A third modification of rolling bearing 50 will be described below.

Figure 34:
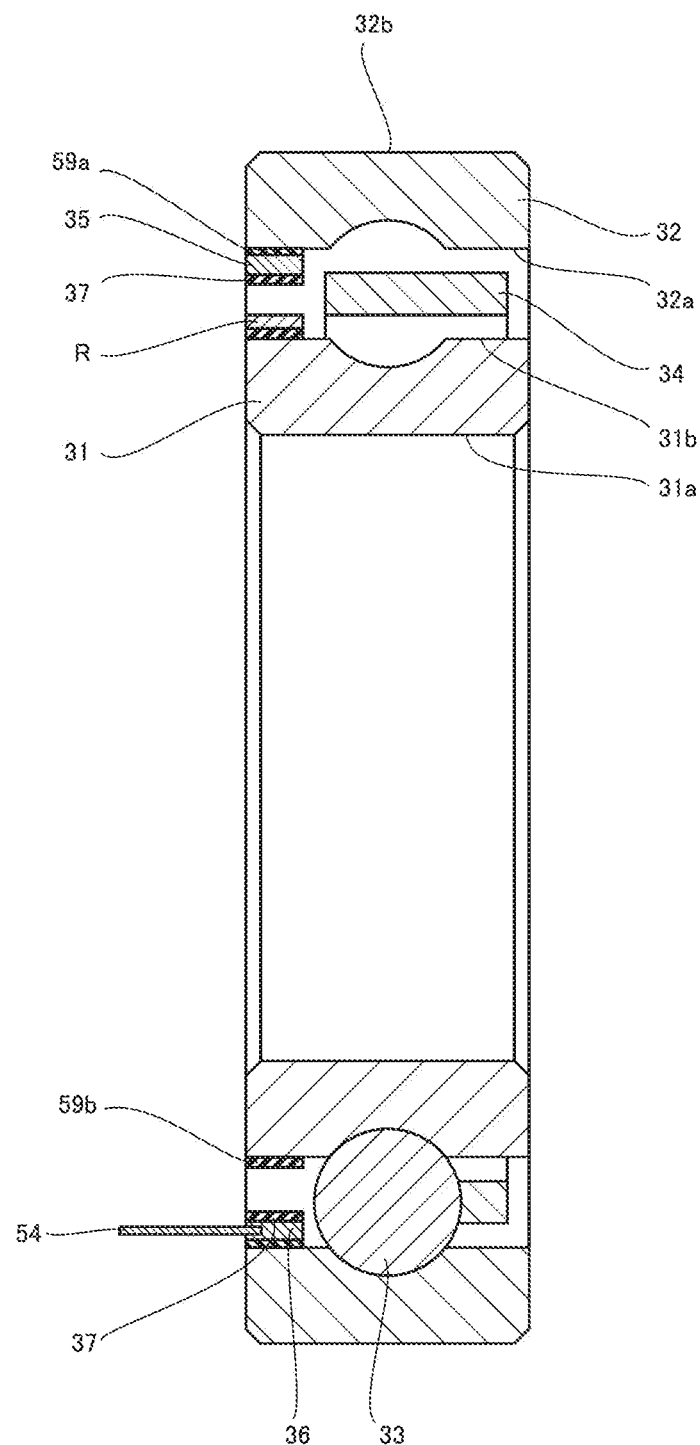
FIG. 34 is a cross-sectional view of a third modification of rolling bearing 50.

FIG. 34 is a cross-sectional view of the third modification of rolling bearing 50. In the third modification, as shown in FIG. 34, first electrode 35 and second electrode 36 are formed on outer ring 32 (more specifically, inner peripheral surface 32a), in place of substrate 51. In the third modification, third electrode R is formed on inner ring 31 (more specifically, outer peripheral surface 31b), in place of annular member 55. First electrode 35 and second electrode 36 are electrically isolated from outer ring 32 by an insulating film 59a, and third electrode R is electrically isolated from inner ring 31 by an insulating film 59b. Even in the third modification, the first distance and the second distance change with time with rotation of inner ring 31, and the phase of temporal change of the first distance and the phase of temporal change of the second distance are shifted from each other. Accordingly, the third modification operates similarly to rolling bearing 50.

Eighth Embodiment

A configuration of a rolling bearing (hereinafter referred to as "rolling bearing 60") according to an eighth embodiment will be described below. Here, the differences from the configuration of rolling bearing 50 will be mainly described and an overlapping description will not be repeated.

Figure 35:
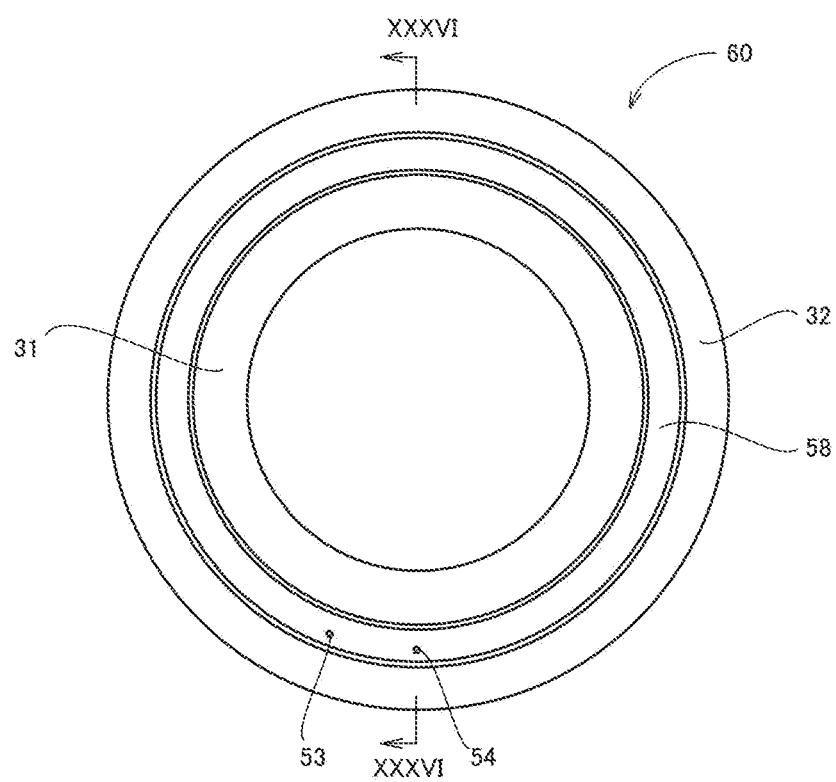
FIG. 35 is a top view of a rolling bearing 60.
Figure 36:
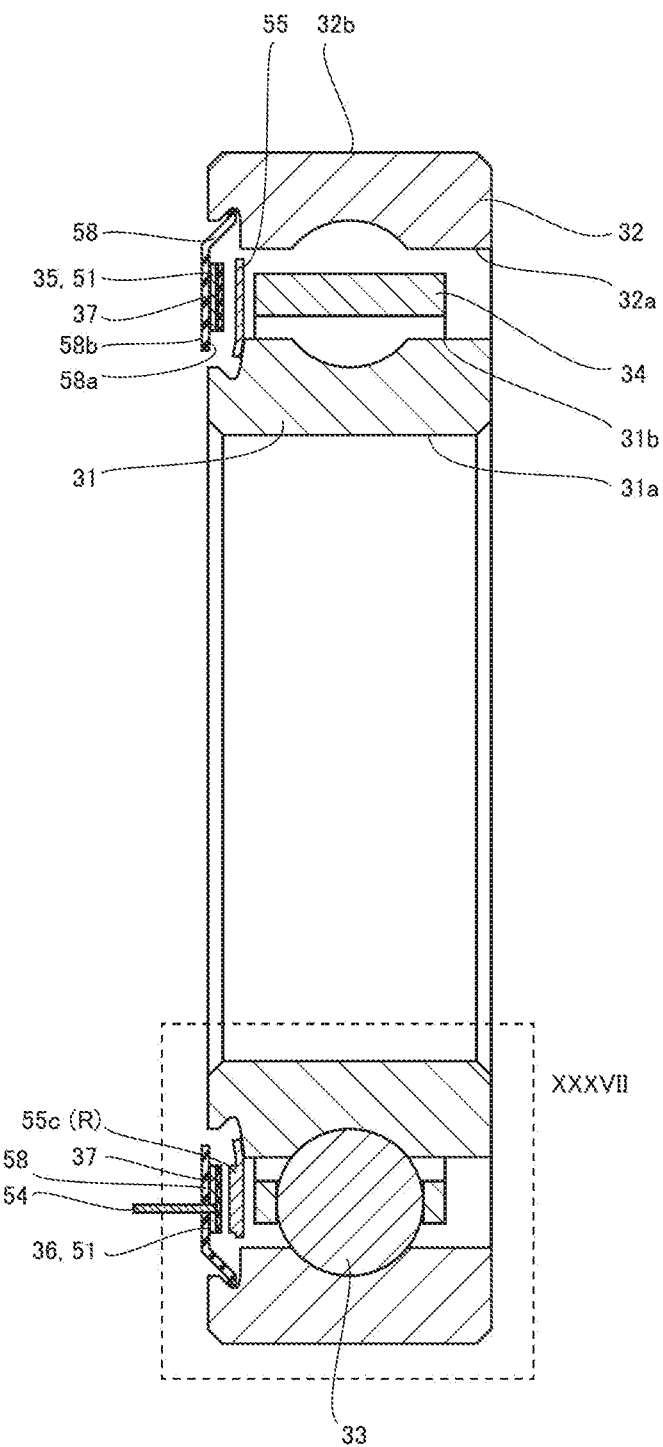
FIG. 36 is a cross-sectional view along line XXXVI-XXXVI in FIG. 35.
Figure 37:
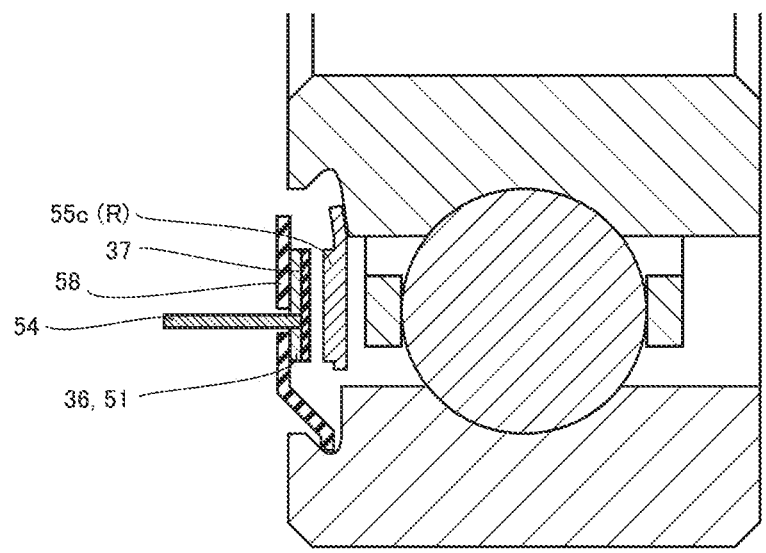
FIG. 37 is an enlarged view of region XXXVII in FIG. 36.

FIG. 35 is a top view of rolling bearing 60. FIG. 36 is a cross-sectional view along line XXXVI-XXXVI in FIG. 35. FIG. 37 is an enlarged view of region XXXVII in FIG. 36. As shown in FIG. 35 to FIG. 37, rolling bearing 60 is a deep groove ball bearing and includes an inner ring 31, an outer ring 32, rolling elements 33, and a cage 34. Rolling bearing 60 further includes first electrodes 35, second electrodes 36, an insulating film 37, third electrodes R, a substrate 51, a lead-out wire 53, a lead-out wire 54, and an annular member 55.

Rolling bearing 60 differs from rolling bearing 50 in that it further includes a seal member 58. Seal member 58 closes at least a part of the bearing space between outer ring 32 and inner ring 31. Seal member 58 is attached to outer ring 32. Seal member 58 has a first surface 58a and a second surface 58b. First surface 58a is a surface directed toward the bearing space. Second surface 58b is the opposite surface to first surface 58a. In rolling bearing 60, the first distance is the distance between third electrode R and first electrode 35 in the center axial direction, and the second distance is the distance between third electrode R and second electrode 36 in the center axial direction.

Figure 38:
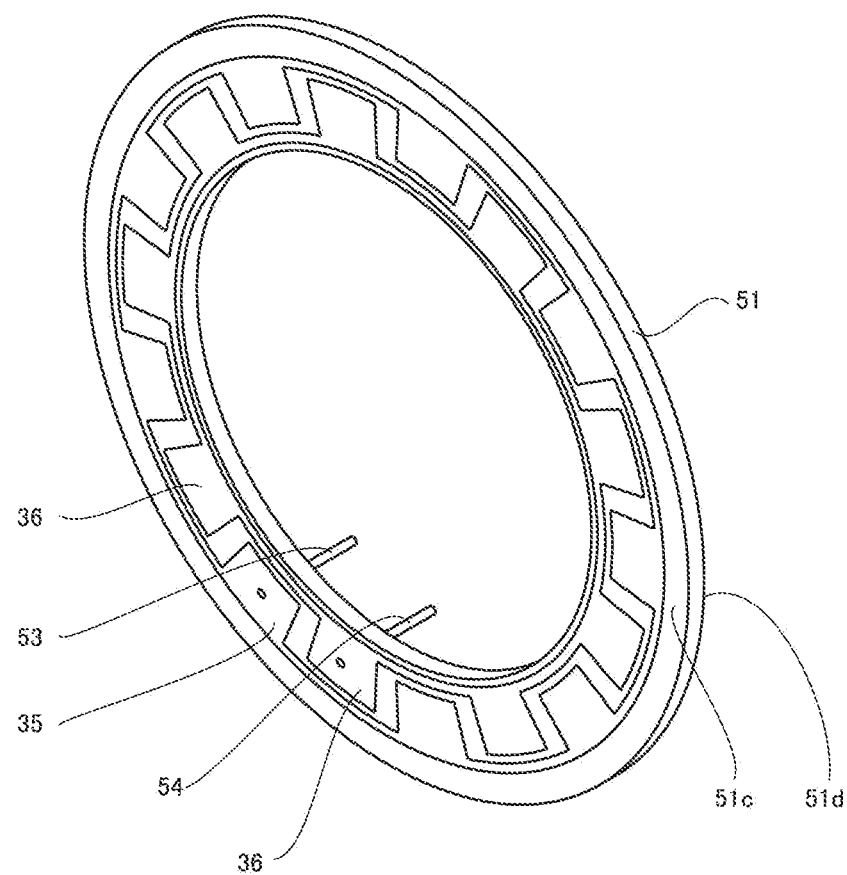
FIG. 38 is a perspective view of substrate 51 in rolling bearing 60.

Rolling bearing 60 differs from rolling bearing 50 in detail configuration of first electrodes 35, second electrodes 36, and substrate 51. FIG. 38 is a perspective view of substrate 51 in rolling bearing 60. As shown in FIG. 38, substrate 51 has a third surface 51c and a fourth surface 51d. Fourth surface 51d is the opposite surface to third surface 51c. Substrate 51 is arranged on seal member 58 such that fourth surface 51d faces first surface 58a.

First electrodes 35 and second electrodes 36 are arranged on third surface 51c. Rolling bearing 60 and rolling bearing 50 are common in that first electrodes 35 and second electrodes 36 are alternately arranged at regular intervals along the circumferential direction.

Figure 39:
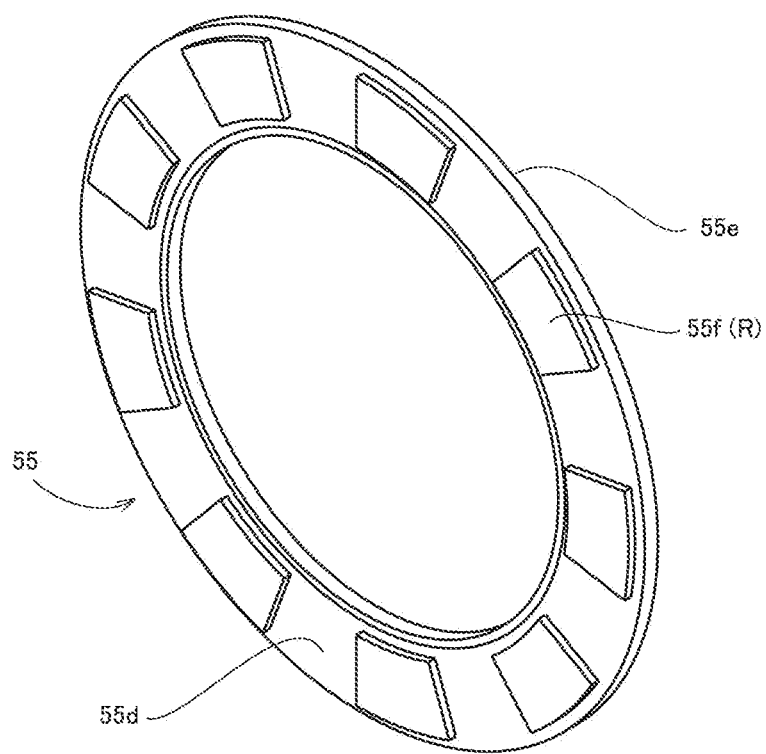
FIG. 39 is a perspective view of annular member 55 in rolling bearing 60.

Rolling bearing 60 differs from rolling bearing 50 in detail configuration of third electrodes R and annular member 55. FIG. 39 is a perspective view of annular member 55 in rolling bearing 60. As shown in FIG. 39, annular member 55 has a first surface 55d and a second surface 55e. Second surface 55e is the opposite surface to first surface 55d.

First surface 55d has protrusions 55f. Protrusions 55f project toward the opposite side to second surface 55e. Protrusions 55f form third electrodes R. Annular member 55 is attached to inner ring 31 such that first surface 55d faces first electrodes 35 and second electrodes 36 with insulating film 37 interposed.

Rolling bearing 60 and rolling bearing 50 are common in that protrusions 55f are arranged at regular intervals along the circumferential direction, that the number of protrusions 55f is equal to the number of first electrodes 35 and the number of second electrodes 36, that the first distance and the second distance change with rotation of inner ring 31, and that the phase of temporal change of the first distance and the phase of temporal change of the second distance are shifted from each other.

The effect of rolling bearing 60 will be described below. Here, the differences from the effect of rolling bearing 50 will be mainly described and an overlapping description will not be repeated.

Even in rolling bearing 60, the first distance and the second distance change with time with rotation of inner ring 31, and the phase of temporal change of the first distance and the phase of temporal change of the second distance are shifted from each other. Therefore, electricity is generated in first electrodes 35 and second electrodes 36. Even in rolling bearing 60, since all of first electrodes 35, second electrodes 36, insulating film 37, and third electrodes R, which are components for generating electricity, are arranged in the bearing interior, a power generating function is incorporated in the bearing interior.

<Modification>

A modification of rolling bearing 60 will be described below.

Figure 40:
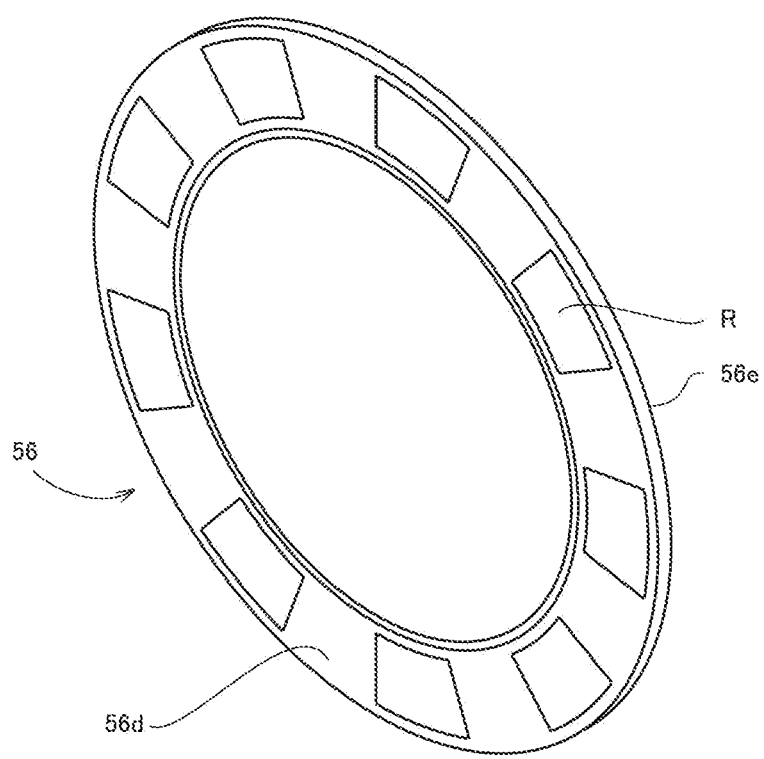
FIG. 40 is a perspective view of annular member 56 in a modification of rolling bearing 60.

In a modification, an annular member 56 is used in place of annular member 55. Annular member 56 has an annular shape. Annular member 56 is formed of an insulating material. FIG. 40 is a perspective view of annular member 56 in the modification of rolling bearing 60. As shown in FIG. 40, annular member 56 has a first surface 56d and a second surface 56e. Annular member 56 is attached to inner ring 11 such that first surface 56d faces first electrodes 15 and second electrodes 16 with insulating film 37 interposed. Third electrodes R are formed on first surface 56d. Third electrodes R are arranged at regular intervals along the circumferential direction. Thus, the modification also operates similarly to rolling bearing 60.

Ninth Embodiment

A configuration of a power generating device (hereinafter referred to as "power generating device 100") according to a ninth embodiment will be described below.

Figure 41:
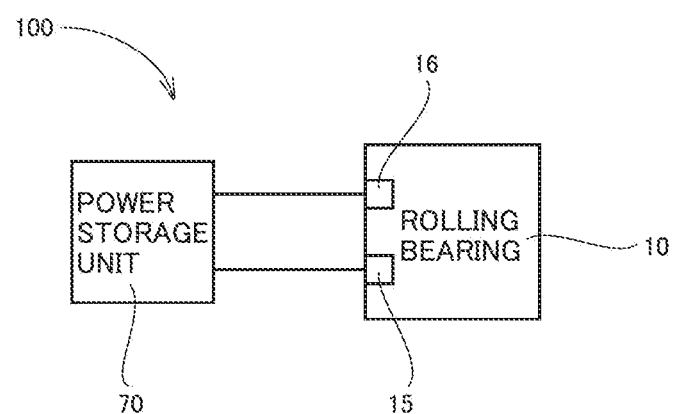
FIG. 41 is a block diagram of a power generating device 100.

FIG. 41 is a block diagram of power generating device 100. As shown in FIG. 41, power generating device 100 includes rolling bearing 10 and a power storage unit 70. In power generating device 100, rolling bearing 10A, rolling bearing 20, rolling bearing 20A, rolling bearing 30, rolling bearing 40, rolling bearing 50, or rolling bearing 60 may be used in place of rolling bearing 10. Power storage unit 70 is configured with, for example, a capacitor. Power storage unit 70 is electrically connected to first electrode 15 and second electrode 16. Thus, electricity generated in first electrode 15 and second electrode 16 by relative rotation of inner ring 11 to outer ring 12 is stored in power storage unit 70.

Tenth Embodiment

A configuration of a sensor-equipped rolling bearing (hereinafter referred to as "sensor-equipped rolling bearing 200") according to a tenth embodiment will be described below.

Figure 42:
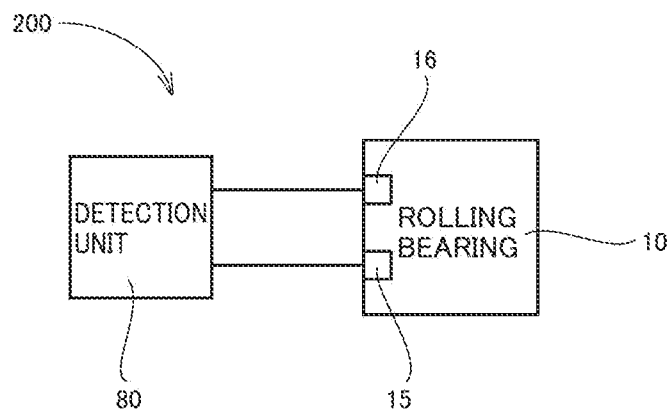
FIG. 42 is a block diagram of a sensor-equipped rolling bearing 200.

FIG. 42 is a block diagram of sensor-equipped rolling bearing 200. As shown in FIG. 42, sensor-equipped rolling bearing 200 includes a rolling bearing 10 and a detection unit 80. In sensor-equipped rolling bearing 200, rolling bearing 10A, rolling bearing 20, rolling bearing 20A, rolling bearing 30, rolling bearing 40, rolling bearing 50, or rolling bearing 60 may be used in place of rolling bearing 10.

Detection unit 80 is electrically connected to first electrode 15 and second electrode 16. Detection unit 80 is configured to detect the revolution speed of cage 14 based on the voltage between electrodes. Detection unit 80 may be configured to estimate the relative rotation speed of inner ring 11 to outer ring 12 based on the revolution speed of cage 14. The relative rotation speed of inner ring 11 to outer ring 12 is estimated by computation of multiplying the revolution speed of cage 14 detected based on the voltage between electrodes by a predetermined coefficient. Detection unit 80 may be configured to detect a state of lubricant L supplied in the interior of rolling bearing 10 (for example, the amount of water included in lubricant L, the amount of wear particles included in lubricant L, the degree of deterioration of lubricant L), based on the voltage between electrodes. Detection unit 80 can be configured with appropriate electronic circuitry. Detection unit 80 is configured with, for example, a microcomputer.

Although embodiments of the present invention have been described above, the foregoing embodiments is susceptible to various modifications. The scope of the present invention is not intended to be limited to the foregoing embodiments. The scope of the present invention is shown in the claims, and it is intended that all modifications within the meaning and range of equivalence to the claims are embraced here.

INDUSTRIAL APPLICABILITY

The foregoing embodiments are advantageously applied particularly to rolling bearings such as cylindrical roller bearing, tapered roller bearing, ball bearing, hub bearing, and rolling bearing for railway cars.

REFERENCE SIGNS LIST 10 rolling bearing, 10A rolling bearing, 11a inner peripheral surface, 11b outer peripheral surface, 12 outer ring, 12a top surface, 12b bottom surface, 12c inner peripheral surface, 12ca depression, 12cb, 12cc flange, 13 rolling element, 13a top surface, 13b bottom surface, 14 cage, 14a inner peripheral surface, 14b outer peripheral surface, 14ba protrusion, 14bb depression, 14c through hole, 15 first electrode, 16 second electrode, 17, 18 insulating film, 20 rolling bearing, 20A rolling bearing, 21 inner ring, 21a top surface, 21b bottom surface, 21c inner peripheral surface, 21d outer peripheral surface, 21e flange, 22 outer ring, 22a inner peripheral surface, 22b outer peripheral surface, 23 rolling element, 23a top surface, 23b bottom surface, 23c side surface, 24 cage, 24a inner peripheral surface, 24aa protrusion, 24ab depression, 24b outer peripheral surface, 24c through hole, 25 first electrode, 26 second electrode, 27, 28 insulating film, 30 rolling bearing, 31 inner ring, 31a inner peripheral surface, 31b outer peripheral surface, 32 outer ring, 32a inner peripheral surface, 32b outer peripheral surface, 33 rolling element, 33a surface, 34 cage, 34a retaining portion, 34b coupling portion, 34c protrusion, 34d end surface, 34e first member, 34f second member, 35 first electrode, 36 second electrode, 37 insulating film, 38 seal member, 38a front surface, 38b back surface, 39 insulating film, 40 rolling bearing, 41 inner member, 41a hub ring, 41aa raceway surface, 41b inner ring, 41ba raceway surface, 41ab small diameter portion, 42 outer member, 42a inner peripheral surface, 42b projection, 43a, 43b rolling element, 44a cage, 44aa protrusion, 44b cage, 45 first electrode, 46 second electrode, 47 insulating film, 50 rolling, bearing, 51 substrate, 51a inner peripheral surface, 51b outer peripheral surface, 51c third surface, 51d fourth surface, 52 substrate, 53 lead-out wire, 54 lead-out wire, 55 annular member, 55a inner peripheral surface, 55b outer peripheral surface, 55c protrusion, 55d first surface, 55e second surface, 55f protrusion, 56 annular member, 56a inner peripheral surface, 56b outer peripheral surface, 56c depression, 56d first surface, 56e second surface, 57 coating film, 58 seal member, 58a first surface, 58b second surface, 59a, 59b insulating film, 60 rolling bearing, 70 power storage unit, 80 detection unit, 100 power generating device, 200 sensor-equipped rolling bearing, DIS distance, L lubricant, R third electrode, T thickness.

The invention claimed is:

1. A rolling bearing comprising:
a stationary ring having a first facing surface;
a rotating ring having a second facing surface facing the first facing surface, the rotating ring rotating relative to the stationary ring;

rolling elements arranged between the first facing surface and the second facing surface;

a cage that retains the rolling elements;

first electrodes and second electrodes;

third electrodes fixed in position relative to the rotating ring, the rolling elements, or the cage;

an insulating film formed on surfaces of the first electrodes and the second electrodes; and a lubricant, wherein the third electrodes are each arranged such that a first distance that is a distance from the first electrode and a second distance that is a distance from the second electrode change with rotation of the rotating ring relative to the stationary ring, the first electrodes and the second electrodes are alternately arranged along a circumferential direction such that a phase of temporal change of the first distance is shifted from a phase of temporal change of the second distance, and the third electrodes and the insulating film slide on each other with the lubricant interposed in accordance with rotation of the rotating ring relative to the stationary ring so as to generate electricity in the first electrodes and the second electrodes.

2. The rolling bearing according to claim 1, wherein the first electrodes and the second electrodes are arranged in a bearing space between the stationary ring and the rotating ring and are fixed in position relative to the stationary ring, and the third electrodes are arranged in the bearing space and fixed in position relative to the rotating ring.

3. The rolling bearing according to claim 2, further comprising a first annular member formed of a conductive material and attached to the second facing surface, wherein the first annular member has a first surface facing the first facing surface and a second surface facing the second facing surface, the first surface has a protrusion projecting toward the first facing surface, and the protrusion forms the third electrode.

4. The rolling bearing according to claim 2, further comprising an annular member attached to the second facing surface, wherein the annular member has a first surface facing the first facing surface and a second surface facing the second facing surface, and the first surface has a depression recessed toward the second surface, the third electrode being arranged in the depression.

5. The rolling bearing according to claim 2, further comprising a substrate having an annular shape and attached to the first facing surface, wherein the substrate has a third surface facing the second facing surface and a fourth surface facing the first facing surface, and the first electrodes and the second electrodes are formed on the third surface.

6. The rolling bearing according to claim 2, further comprising a seal member at least partially closing the bearing space, wherein the first electrodes and the second electrodes are arranged on a surface on the bearing space side of the seal member.

7. The rolling bearing according to claim 2, wherein the first electrodes and the second electrodes are formed at the stationary ring.

8. The rolling bearing according to claim 2, wherein the third electrodes are formed at the rotating ring.

9. The rolling bearing according to claim 2, wherein the first electrodes and the second electrodes are alternately arranged at regular intervals along a circumferential direction, the third electrodes are arranged at regular intervals along the circumferential direction, and the number of the third electrodes is equal to the number of the first electrodes and the number of the second electrodes.

10. The rolling bearing according to claim 2, further comprising a coating film formed on at least one of the insulating film and on the third electrodes.

11. The rolling bearing according to claim 10, wherein the coating film is formed of DLC.

12. The rolling bearing according to claim 10, wherein the coating film is formed of an alloy containing nickel.

13. The rolling bearing according to claim 2, wherein the insulating film is formed of DLC.

14. The rolling bearing according to claim 1, wherein the insulating film has a thickness equal to or less than 100 μm.

15. The rolling bearing according to claim 1, wherein rolling elements or the cage serves as the third electrodes.

16. The rolling bearing according to claim 15, wherein the rolling elements are balls, the cage serves as the third electrodes, and the cage has a protrusion projecting along a center axial direction at a portion retaining each rolling element.

17. The rolling bearing according to claim 15, wherein the rolling elements are arranged at regular intervals along a circumferential direction, the number of the first electrodes and the number of the second electrodes are each an integer multiple of the number of the rolling elements, and the first electrodes and the second electrodes are alternately arranged at regular intervals along the circumferential direction.

18. The rolling bearing according to claim 15, wherein the cage serves as the third electrodes, and a surface of the cage that faces the first electrodes has protrusions each projecting toward the first electrode.

19. The rolling bearing according to claim 18, wherein the protrusions are arranged at regular intervals along a circumferential direction, the number of the first electrodes and the number of the second electrodes are each an integer multiple of the number of the protrusions, and the first electrodes and the second electrodes are alternately arranged at regular intervals along the circumferential direction.

20. The rolling bearing according to claim 15, further comprising a seal member defining a bearing space between the stationary ring and the rotating ring, wherein the first electrodes and the second electrodes are arranged on a surface on the bearing space side of the seal member.

21. The rolling bearing according to claim 15, wherein the insulating film is a film formed of an electrifiable material, and the insulating film is a polytetrafluoroethylene film.

22. The rolling bearing according to claim 15, wherein the insulating film has a thickness equal to or less than 100 μm.

23. A sensor-equipped rolling bearing assembly comprising:
- a rolling bearing of claim 15; and
- a detection unit that detects a revolution speed of the cage based on a voltage between the first electrode and the second electrode.

24. The sensor-equipped rolling bearing according to claim 23, wherein the detection unit is capable of estimating a relative rotation speed of the stationary ring to the rotating ring based on the revolution speed of the cage.

25. A sensor-equipped rolling bearing assembly comprising:
- a rolling bearing of claim 1; and
- a detection unit that detects a state of lubricant supplied in interior of the rolling bearing based on a voltage between the first electrode and the second electrode.

26. The sensor-equipped rolling bearing according to claim 25, wherein the state of the lubricant detected by the detection unit is the amount of water contained in the lubricant.

* * * * *